United States Patent [19]
Coelho et al.

[11] Patent Number: 6,128,016
[45] Date of Patent: Oct. 3, 2000

[54] GRAPHIC USER INTERFACE FOR MANAGING A SERVER SYSTEM

[75] Inventors: Robert A. Coelho, Canton; James Bertone, Quincy, both of Mass.

[73] Assignee: NEC Corporation, Tokyo, Japan

[21] Appl. No.: 08/771,616

[22] Filed: Dec. 20, 1996

[51] Int. Cl.[7] .................................................. G06F 15/00
[52] U.S. Cl. ...................... 345/347; 345/356; 707/102; 709/223
[58] Field of Search ..................................... 345/348, 349, 345/352, 356, 357, 335, 338, 347; 707/101, 102, 103, 104; 709/223, 224, 225, 226

[56] References Cited

U.S. PATENT DOCUMENTS

| | | | |
|---|---|---|---|
| 5,325,527 | 6/1994 | Cwikowski et al. | 395/200.52 |
| 5,454,102 | 9/1995 | Tang et al. | 395/600 |
| 5,535,035 | 7/1996 | DeFoster et al. | 359/161 |
| 5,701,137 | 12/1997 | Kiernan et al. | 345/119 |
| 5,801,702 | 9/1998 | Dolan et al. | 345/357 |

FOREIGN PATENT DOCUMENTS

| | | | |
|---|---|---|---|
| 0453273 | 10/1991 | European Pat. Off. | H04L 12/42 |
| 2 617 354 | 12/1988 | France . | |

OTHER PUBLICATIONS

New Peripheral Interfaces: Fast & Full of Features; M. Wright; EDN Electrical Design News; vol. 40, No. 21, Oct. 12, 1995; pp. 69/70, 72, 74, 76, 78, 80, 81.

*Primary Examiner*—Ba Huynh
*Attorney, Agent, or Firm*—Katten Muchin Zavis

[57] ABSTRACT

A graphical user interface provides a navigation model in the form of a hierarchical tree structure which is representative of a server system a user selected to manage. The hierarchical tree structure is populated or built to include a number of icons representative of different classes or categories of major components and their associated subcomponents contained in the selected server system and their logical relationships. In response to user icon selections, the navigation model expands and collapses the tree structure in a predetermined manner so as to enable the user to easily navigate through the different levels of components and subcomponents of the server with a minimum amount of information and determine status in addition to setting threshold values for items to be managed within the server system.

33 Claims, 13 Drawing Sheets

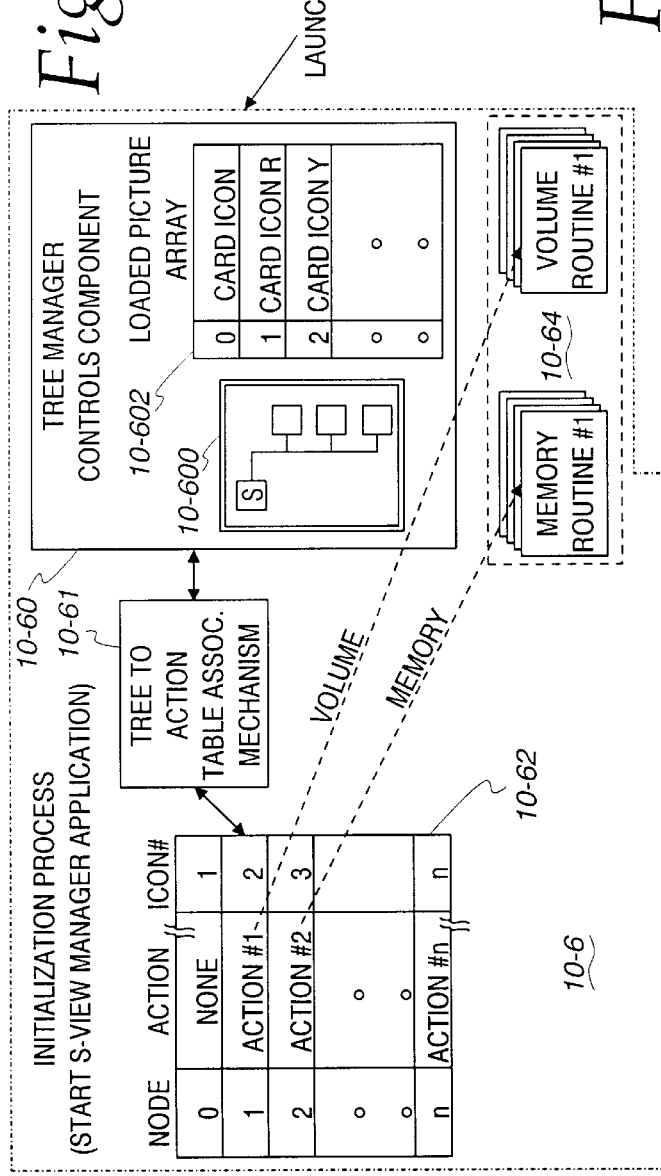
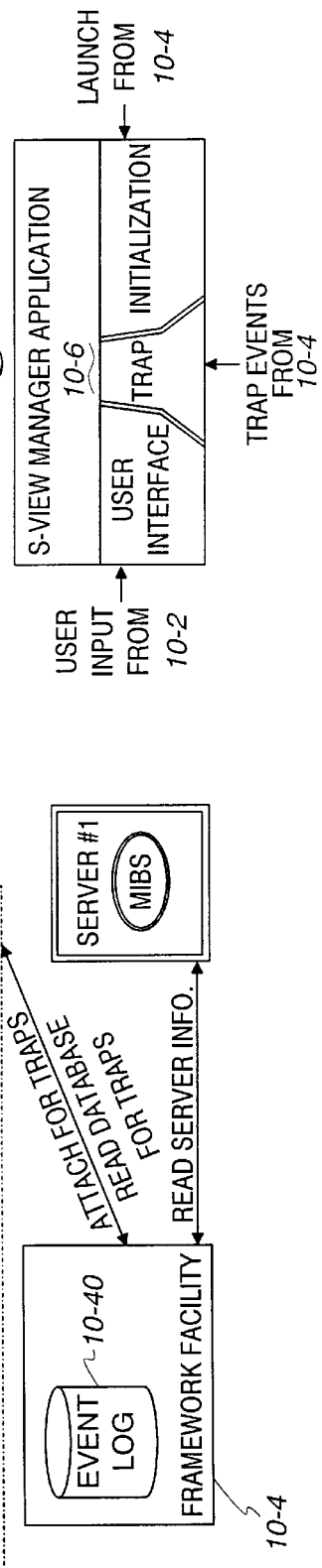

```
|--INDENTATION LEVEL #0 (ROOT)
| |--INDENTATION LEVEL #1 (CHILD)
| | |--INDENTATION LEVEL #2 (GRANDCHILD)
| | |

NODE #0    (PICTURE)  SERVER SMX3     (PARENT)
NODE #1    (PICTURE)  LOGICAL VOLUME  (LEAF)
NODE #2    (PICTURE)  CPUs            (PARENT)
NODE #3    (PICTURE)  CPU #1          (LEAF)
NODE #4    (PICTURE)  CPU #2          (LEAF)
```

Fig. 5j
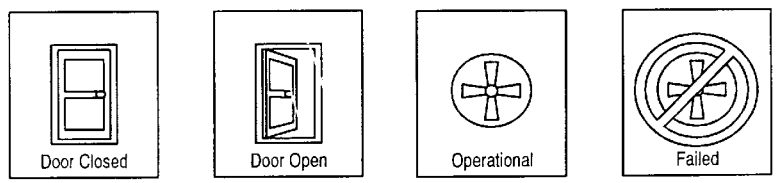
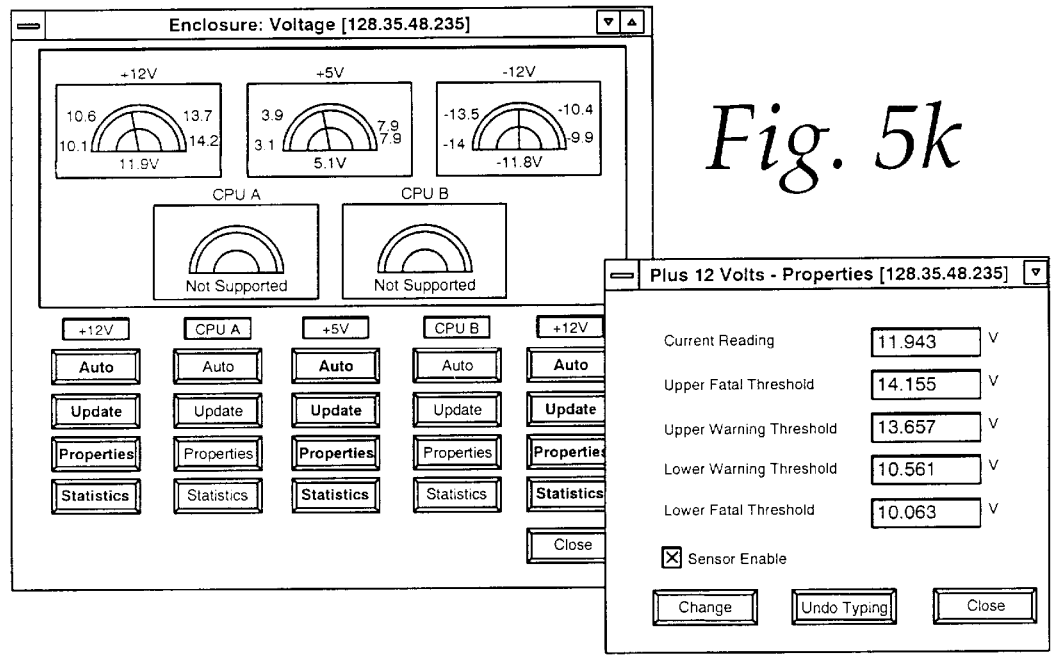
Fig. 5k
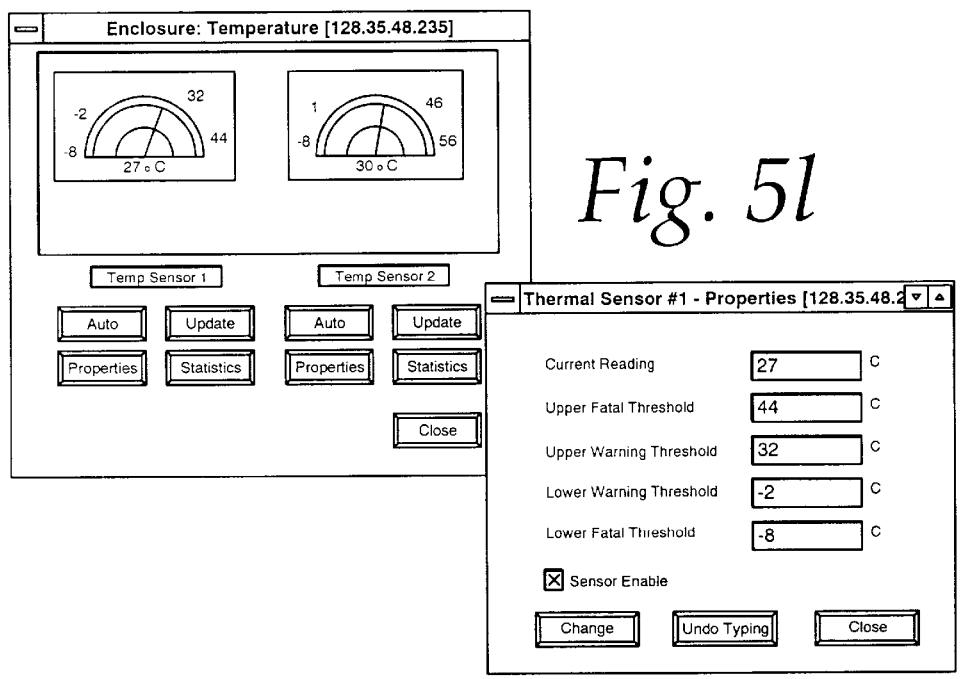
Fig. 5l

GRAPHIC USER INTERFACE FOR MANAGING A SERVER SYSTEM

BACKGROUND OF THE INVENTION

1. Field of Use

The present invention relates to network management and, more particularly, to graphical user interfaces for managing server systems operation and performance.

2. Prior Art

In recent years, attention has shifted from the connectivity and interoperability of heterogeneous networks to network management. That is, great attention is being given to keeping track of the elements such as concentrators, routers and bridges on a network, checking on the network's performance and diagnosing and correcting problems. Most recently, server systems have been added to the list of managed network elements.

Through remote management, network administrators no longer need to travel to the server system locations but can diagnose and troubleshoot problems using their own workstations at their own sites.

Network management systems have required administrators to become experienced in using certain graphical user interfaces and framework systems in communicating with network elements. These systems can collect substantial amounts of information which are required to be evaluated by the administrator. It has been noted that network management systems place a substantial burden on the network administrator. In order to properly evaluate such information, the administrator must understand the topology of the network and the different elements within the network. Also, the administrator must be able to evaluate volumes of information and alarm information in order to establish the cause of a problem The addition of server systems adds substantial complexity to network management function in that the characteristics of such systems can vary from system to system and require that the network administrator be knowledgeable about the different components of each of the different types of server systems connected to the network.

In order to facilitate network management, one prior art system described in U.S. Pat. No. 5,261,044 provides a visual display of information relating to the network entities. The network entities are represented on the visual display by icons, each icon having a plurality of user selectable areas. In response to a user selection of a prescribed area of an icon, the network management system provides a visual display of detailed information regarding a particular aspect of the network entity which the icon represents with each user selectable area of the icon providing a different visual display of detailed information regarding the network entity.

While depictions or physical representations of network elements as icons facilitate network management, this approach is not easily adapted to changes in network elements. For example, when a new element is added to the network or the characteristics of an existing element is changed, it becomes necessary to generate a new physical representation of the element to show the particular set of monitoring points to be used in diagnosing problems. Further, above the prior art approach does not relieve the network administrator from having to acquire the requisite knowledge for managing new network elements.

Accordingly, it is a primary object of the present invention to provide a graphical user interface which facilitates server network management by less experienced personnel.

It is a further object of the present invention to provide an information model as part of a graphical user interface which is readily understandable to the user and is easy to use in locating problems.

SUMMARY OF THE INVENTION

The above objects and advantages of the present invention are achieved in a preferred embodiment of a graphical user interface which provides a navigation model representative of the server system being managed. In the preferred embodiment, the graphic interface is used by a manager application integrated into a network/server management framework facility. The server navigation model utilizes a hierarchical tree structure which when displayed represents all of the classes or categories of components and their logical relationships to each other for the server system being managed. In the preferred embodiment, the different components are represented in the tree structure by labels in the form of icons along with textual identification for the icons. The icons are pictorial representations of the elements which they represent to facilitate ease of use and understanding of server partitioning.

The classes or categories of components were established by analyzing the different members of the server family to define all of the components utilized by the server systems and then grouping these components into classes or categories representing the logical partitioning of each server system. That is, in the preferred embodiment, the major component classes are defined as including configuration, mass storage and enclosure components. These component classes are represented by a first level of tree icons. Each of these classes of components are further broken down into their respective subcomponents. For example, the configuration class is represented by a second level of tree icons containing I/O devices, processors and memory as subcomponents. The mass storage class is represented by a second level of tree icons as containing a number of volume subcomponents. The enclosure class is represented by a second level of tree icons as containing temperature, voltage, door and fan subcomponents. In response to a user selection of a component within a major server class, the graphical user interface displays either a next level of icons or a dialog or information screen when the selected icon represents a base component (i.e. a component which can not be further partitioned). Because the icons are generic representations of the different components of a server system rather than depictions of specific components, they can be used with the variety of different devices which fall within a particular class or category of component.

The graphical interface utilizes an easy to understand method of changing the colors of tree icons for signaling traps such as alerts, fault conditions or events denoting the occurrences of preestablished conditions (e.g. voltage and temperature thresholds). More specifically, if at the time the manager application is launched a trap is pending, the very first level of the tree structure model when opened up signals the user of the pending alert. This results in the displaying in red, the major component icon associated with the trap. This provides the user with visual information pertaining to the trap which the user can then use to immediately locate the problem by selecting the red icon and displaying a presentation screen containing the icon associated with the trap.

As indicated above, the graphic interface of the present invention can be used to manage a family of different types of server systems by generating the tree structure and associated icons on the basis of server class or type. In the preferred embodiment, the information defining the class or type server system and its characteristics is first obtained from the server system being managed. Entries used in generating the tree structure with its associated icons are derived from the information returned by the server system. This allows icons to be omitted or included from the tree representation of the server system as required for displaying its characteristics. This type of built in expandability enables use of the same navigational model in future designs.

The above objects and advantages of the present invention will be better understood from the following description when taken in conjunction with the accompanying drawings.

BRIEF DESCRIPTION OF THE DRAWINGS

FIGS. 4a through 4d are used in describing the different types of operational flow of the graphic interface of the present invention.

FIGS. 5a through 5l are display screens utilized in connection with the graphical interface of the present invention.

DESCRIPTION OF THE PREFERRED EMBODIMENT

FIG. 1a

Figure 1A:
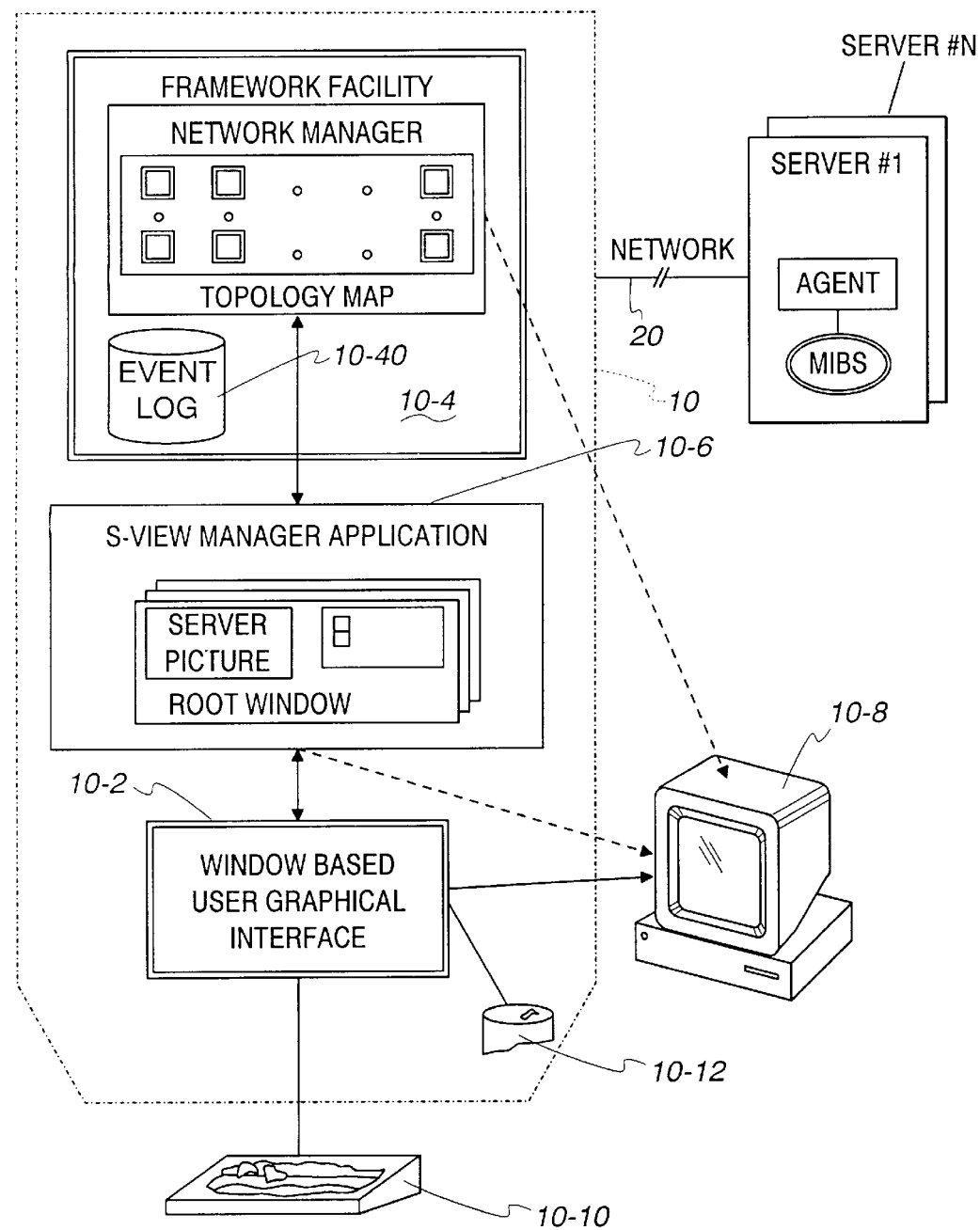
FIGS. 1a and 1b are different functional views of a network management workstation based system which incorporates the graphical interface of the present invention.

FIG. 1a shows a block diagram of a network management workstation 10 which utilizes the graphic interface of the present invention. The major components of workstation 10 include a window based graphical user interface 10-2, a software framework facility 10-4 and a server (S) view manager application 10-6 which incorporates the graphic interface of the present invention.

As shown, the workstation 10 has associated therewith a video display device 10-8, a keyboard 10-10 and a mouse 10-12, each of which operatively couples to interface 10-2 in a standard manner. The user interface 10-2 controls the operation by the display device 12, keyboard 14 and mouse 16 and provides the user or operator with display screens generated by both framework facility 10-4 and S-view manager application 10-6 which is denoted by the dotted lines in FIG. 1a.

The workstation 10 connects to a plurality of server systems 1 through N through a communications network 20. As described herein, workstation 10 framework facility 10-4 during the execution of the S-view manager application 10-6 converts requests for reading and writing data from the application 10-6 into the appropriate management application protocols within the TCP/IP protocol suite for communicating with each of the server systems 1–N.

In the present embodiment, the Simple Network Management Protocol (SNMP) is used. SNMP is a well known asynchronous request/response protocol used in systems management applications which provides the following four operations: (1) get which is used to retrieve specific management information; (2) get-next which is used to retrieve via traversal, management information; (3) set which is used to manipulate management information; and, (4) trap which is used to report extraordinary events. For more information regarding the SNMP protocol, reference may be made to the Internet standard RFC1157 published by the Internet Activities Board of to the text entitled "The Simple Book An Introduction to Management of TCP/IP based Internet" by Marshall T. Rose, published by Prentice Hall, copyright 1991.

As illustrated in FIG. 1a, each of the server systems includes an SNP agent software component which operatively couples to network 20 and exchanges network management information with workstation 10. It will also be noted that the agent component operatively couples to a number of management information bases (MIBs) which describe various "objects" in a tree structure. For example, one MIB may contain objects pertaining to the characteristics of the network while another MIB may contain objects pertaining to components of the managed server system. For an example of such agent software, reference may be made to the copending patent application of Daniel G. Peters, Charles F. Corbett and Dennis R. Flynn entitled "An Extendible and Portable Network Based System Management Architecture, Ser. No. 60/017,072 filed on Apr. 30, 1996.

FIG. 1b

Figure 1B:
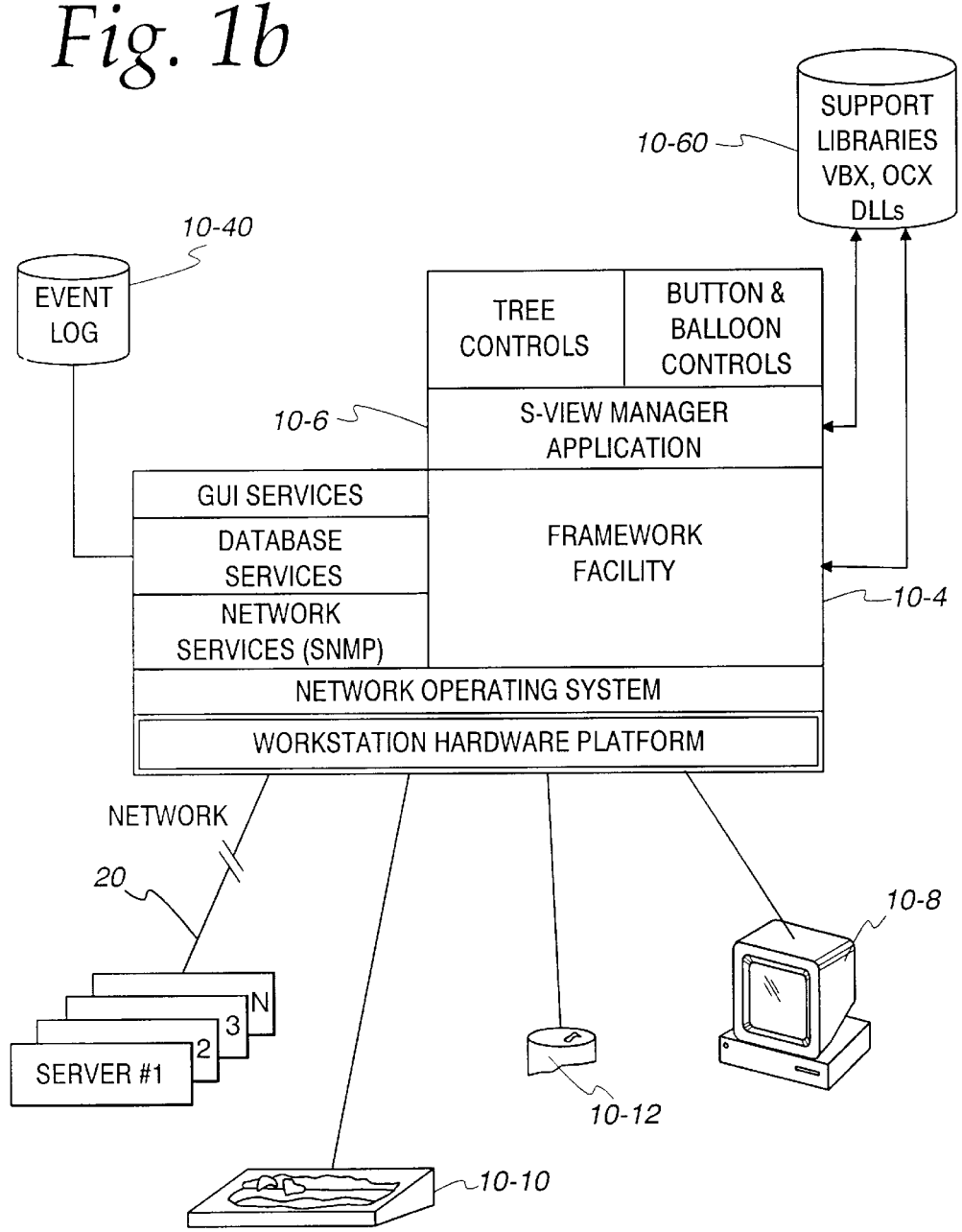

FIG. 1b illustrates in greater detail, the workstation 10 from a software/hardware architecture view point. As shown, workstation 10 includes a hardware platform such as a multiprocessor computer system based on the Intel® Pentium® chip set. The hardware platform runs under the control of a network operating system, such as Microsoft® Windows® NT operating system. The framework facility 10-4 is a network management application which runs on top of the network operating system. In the present embodiment, the framework facility corresponds to HP OpenView for Windows, a network management software manufactured by Hewlett-Packard Company.

As indicated in FIG. 1b, the network management software provides a number of services and resources through a set of custom controls which provide SNMP communications services, Paradox database services for trap handling enabling the forwarding of trap events stored in the event (alarm) log storage 10-40 and graphical user interface services for enabling the S-view manager application 10-6 to interoperate with HP OpenView for Windows. The set of custom controls provide application programmable interfaces (APIs) which are linked into the S-view manager application 10-6 and can be invoked through the use of procedure calls. For example, SNMP communications is provided by another custom control (SNMP control) which is also an API. The SNMP control responds to requests from application 10-6 by issuing requests to the servers and making the data received therefrom available to application 10-6. Another API control (XOV) enables application 10-6 to request information from framework 10-4 such as that pertaining to the identity of a selected server and to a limited extent, send data to firaework 10-4. During operation, application 10-6 requests and receives data from a particular server as the user performs interactions or if periodic updating if in effect. Each data request may be for one data item or several data items and such items may be all numbers, all strings or combinations of numbers and strings.

The S-view manager application 10-6 is integrated into the HP OpenView for Windows framework facility so that it is indistinguishable from the core facilities of the framework. This means that a user is able to launch the S-view manager application 10-6 through the framework's topology map(s). This is achieved by performing an object to server mapping process wherein each of the servers 1 through N are registered or defined as objects being managed by the framework and each server object is in turn defined as having associated therewith, a particular server icon, the S-view manager application and a set of defined traps. Thus, when a particular server object is selected, HP OpenView for Windows passes information to the S-view manager 10-6 for processing. For the purpose of the present invention, it is assumed that the object to server mapping process can be considered to carried out in a conventional manner. For example, information about this process is contained in development kit documentation provided by Hewlett-Packard Company.

In the present embodiment, the S-view manager application 10-6 is a Windows application developed using Microsoft® Visual Basic® 4.0 and includes a collection of procedures or modules (i.e. functions or subroutines). The manager application 10-6 utilizes separate supporting modules provided by the Visual Basic application. These modules utilize custom controls components or functions packaged as separate dynamic-link libraries (DLL) or executable files (.exe) contained in a support library storage 10-60. Additionally, the S-view manager application 10-6 uses other support modules such as those available in MicroHelp OLETools 5.0 and FarPoint Technologies ButtonMaker to complement the functionality of Visual Basic 4.0. The MicroHelp modules are used to implement the tree controls of FIG. 1*b* and include a MhTree custom control module and associated DLL. As described in greater detail herein, the tree controls are used to generate for display to the user, server component class information in hierarchical form, according to the teachings of the present invention. For further information regarding such custom controls, reference may be made to the manual entitled MicroHelp OLE-Tools published by MicroHelp, Inc., Copyright, 1995. The ButtonMaker software is used to implement the picture button of FIG. 1*b* utilized by manager application 10-6.

FIG. 2

Figure 2:
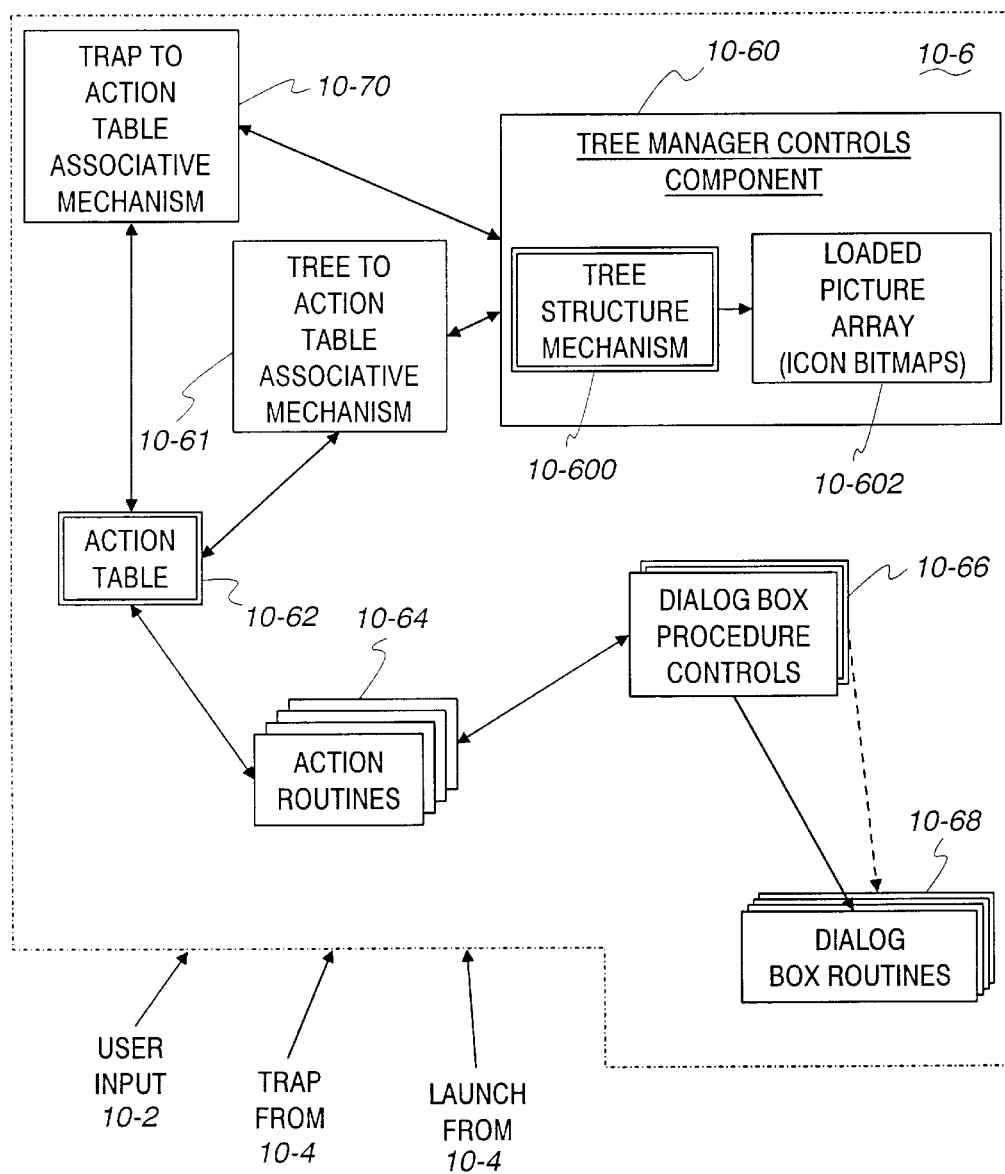
FIG. 2 shows in greater detail, the components of the manager application of FIGS. 1a and 1b which incorporates the graphical interface of the present invention.

FIG. 2 shows in greater detail, the major components included in S-view manager application. As shown, manager application 10-6 includes tree manager controls component 10-60, an action table component 10-62, a plurality of action routines 10-64 associated with table component 10-62, dialog box procedure controls 10-66 which are associated with a plurality of sets of dialog box routines 10-68, an associative mechanism 10-70 which operatively couples to action table component 10-62 and tree controls component 10-60. The application 10-6 receives the inputs indicated representative of events such as the launching of the application, user input selections and traps provided by the framework 10-4 or input user interface 10-2. The application 10-6 also includes procedures which form or support the application's main message loop organized for calling procedures within itself or procedures associated with the other major components of FIG. 2 to process these events.

As shown in FIG. 2, the tree manager controls component 10-60 includes a tree structure mechanism 10-600 which is programmed to implement the tree method of the present invention. In response to user mouse selections, the mechanism 10-600 manipulates the displayed tree structure by opening it up to a next level or collapsing it. Also, the mechanism 10-600 provides as output, numerical values indicating which node was selected by the user. These values are used by the main control procedures of block 10-80 which in turn initiates the required sequence of procedures/operations.

As discussed above, the component 10-60 is constructed from the MHTree custom control which is custom populated to reflect the type and quantity of components in the server system being monitored according to the present invention as described herein. The tree structure mechanism 10-600 has associated therewith, a loaded picture array 10-602 which is used for storing a copy of all possible icon bitmaps as either .BMP file names or the actual icon bitmaps. These icons (bitmaps) are originally stored as individual files in a subdirectory when the application 10-6 is set up.

Two indexing schemes are utilized by the application 10-6. One is a palette array wherein each icon is given an arbitrary index starting at zero and such indexing is accomplished by loading the icons into a loaded picture array included in the tree structure mechanism 10-600. The case of a simple example, the loaded picture array could contain the following type of information:

LoadedPicture(0)=gray closed door icon;

LoadedPicture(1)=green closed door;

LoadedPicture(2)=yellow closed door;

LoadedPicture(3)=red closed door;

LoadedPicture(4)=yellow open door;

LoadedPicture(5)=red open door;

LoadedPicture(6)=gray thermometer;

LoadedPicture(7)=green thermometer;

LoadedPicture(8)=gray voltmeter; etc.

The second indexing scheme is used in a color zone array. In this case, the icons are grouped by color in an array(array iaIconMapG) and uniquely numbered so that they can be easily accessed by the tree structure mechanism 10-600. In the case of this example, indices having numerical values 1 to 10 are assigned to the gray colored set of icons, values 11 to 20 are assigned to the corresponding green colored set of icons, values 21 to 30 are assigned to the corresponding yellow colored set of icons and values 31 to 40 are assigned to the corresponding set of red colored icons.

Because all of the sets of icons are in the same order, it is easy to locate an icon having a particular colored icon by adding the same constant value to an initial numerical value. For example, starting with the value 5 for the gray colored disk drive icon, the same constant defining zone size is added to locate the red colored disk icon (e.g. 5+30) which has the value 35. Thus, the integers 5, 15, 25 and 35 are used to designate the gray colored disk drive icon, the green colored disk drive icon, yellow colored disk drive icon and red colored disk drive icon respectively. A possible set of indices for this example is shown in table 1 below.

The iaIconG array is one of the plurality of arrays included in action table 10-62. Action table 10-62 includes a plurality of arrays which hold specific information values for each node of the tree structure so that a node is associated with both a row in the tree structure and an entry in each of the plurality of arrays. The plurality of arrays and descriptions of the values stored are shown in table II below.

The icon and condition code values together are used to uniquely identify the icon. The icon code associated with the node is the index in the color zone array iaIconMapG for the gray icon, as for example iaIconMapG(5) for gray disk drive. The value (iaIconMapG(5)=12) in table I is used as the icon index into the loaded picture array 10-602 in FIG. 2.

TABLE I

| ARRAY | CROSS REF. TO LOADED PICTURE ARRAY | DESIGNATED ICON |
|---|---|---|
| iaIconMapG(1) = | 0 | gray closed door |
| iaIconMapG(2) = | 44 | gray processor (CPU) |
| iaIconMapG(3) = | 27 | gray CD-ROM |
| iaIconMapG(4) = | 6 | gray thermometer |
| iaIconMapG(5) = | 12 | gray disk drive |
| iaIconMapG(6) = | 8 | gray voltmeter |
| iaIconMapG(7) = | 30 | gray tape drive |
| iaIconMapG(8) = | 34 | gray memory board |
| iaIconMapG(9) = | 68 | gray fan |
| iaIconMapG(10) = | 70 | gray enclosure parent icon |
| iaIconMapG(11) = | 1 | green closed door |
| iaIconMapG(12) = | 45 | green processor (CPU) |
| iaIconMapG(13) = | 28 | green CD-ROM |
| iaIconMapG(14) = | 7 | green thermometer |
| iaIconMapG(15) = | 13 | green disk drive |
| iaIconMapG(16) = | 9 | green voltmeter |
| iaIconMapG(17) = | 31 | green tape drive |
| iaIconMapG(18) = | 35 | green memory board |
| iaIconMapG(19) = | 69 | green fan |
| iaIconMapG(20) = | 71 | green enclosure parent icon |
| iaIconMapG(21) = | 2 | yellow closed door |
| iaIconMapG(22) = | 18 | yellow processor (CPU) |
| iaIconMapG(31) = | 3 | red closed door |
| iaIconMapG(32) = | 19 | red processor (CPU) |
| etc. | | |

TABLE II

| | |
|---|---|
| iaActionG array = | stores a value indicating what action to take when the node is doubled clicked on |
| iaLevelG array = | stores a value indicating the level of indentation, to define child, grandchild nodes |
| iaUnitG array = | stores a value defining a unit number associated with a tree subcomponent, such as "1" for processor #1 (CPU#1) |
| iaParentG array = | stores a tree index value of the parent of the subcomponent, such as the value "0" for the root |
| iaCondG array = | stores a value designating a condition or color code, the higher the value the worse the condition |
| iaIconG array = | stores a color zone array index value to identify the gray colored icon shown |
| iaPopularG array = | stores a flag value to indicate that the dialog box for this node has been seen |
| saKey array = | stores a unique string of values for each parent node or a blank value for nodes without children nodes |
| saTreeCap array = | stores a string label value for the node, such as "processor #1 |
| saTreeOidG array = | stores a value identifying which icon to change to red when a trap is received for that node |

The iaActionG array values contained in table 10-62 are used to invoke the appropriate action routine which in turn invokes other routines within the routines 10-64. The action table 10-62 is accessed by associative mechanism 10-70 during the processing of traps or alarms.

Associative mechanism 10-70 provides a means for associating a node in action table 10-62 with a trap event and corresponding colored icon. The mechanism 10-70 contains information which is used to relate the trap to a particular node. There are several different ways of carrying out the required association which depends upon the kind of trap. For example, in the case of traps relating to a particular component class (e.g. temperature), it is only necessary to decode the trap number and then relate that number with a particular node associated with that icon component. For other types of traps, information such as device OID information included as part of the trap, is used to search through the tree OID array of action table 10-62 to identify the node associated with the trap. Mechanism 10-70 also contains other variables for indicating how to relate certain traps with specific nodes. For example, a vector (faOffendLimG, faOffendValG, iaHaveTrapG) is maintained which has entries for each of the 39 possible traps. The trap data which is saved includes the voltage or temperature value that triggered the trap. For storage volume traps, the trap value corresponding to the percentage of storage consumed is saved along with other storage related data (iaLVolOverG). For memory yellow and red error traps, separate vectors (iaMemYTrapsG, iaMemRTrapsG) are used to store data for as many memory related traps that were logged by the framework The main control procedures block 10-80 contains a state variable value I(iStateG) which represents the state of the manager application 10-6 and is used to specify what function or procedure is to be called next. Some of the procedures contain a jump or dispatch table which store entries containing different state variable values and addresses that are used to call the next procedure as a function of having set the state variable value.

It will also be noted that the action routines 10-64 also operatively couple through dialog box procedure controls 10-66 to a plurality of dialog box routines 10-68. As discussed herein, each dialog box utilized in connection with the tree structure of the present invention has its own message loop and some of its own procedures as indicated in FIG. 2. These elements operate to obtain the required information which is to be displayed by the dialog box and carry out the operations initiated by the user pressing or selecting specific control buttons associated with the dialog box.

The Navigation Model

Figure 3:
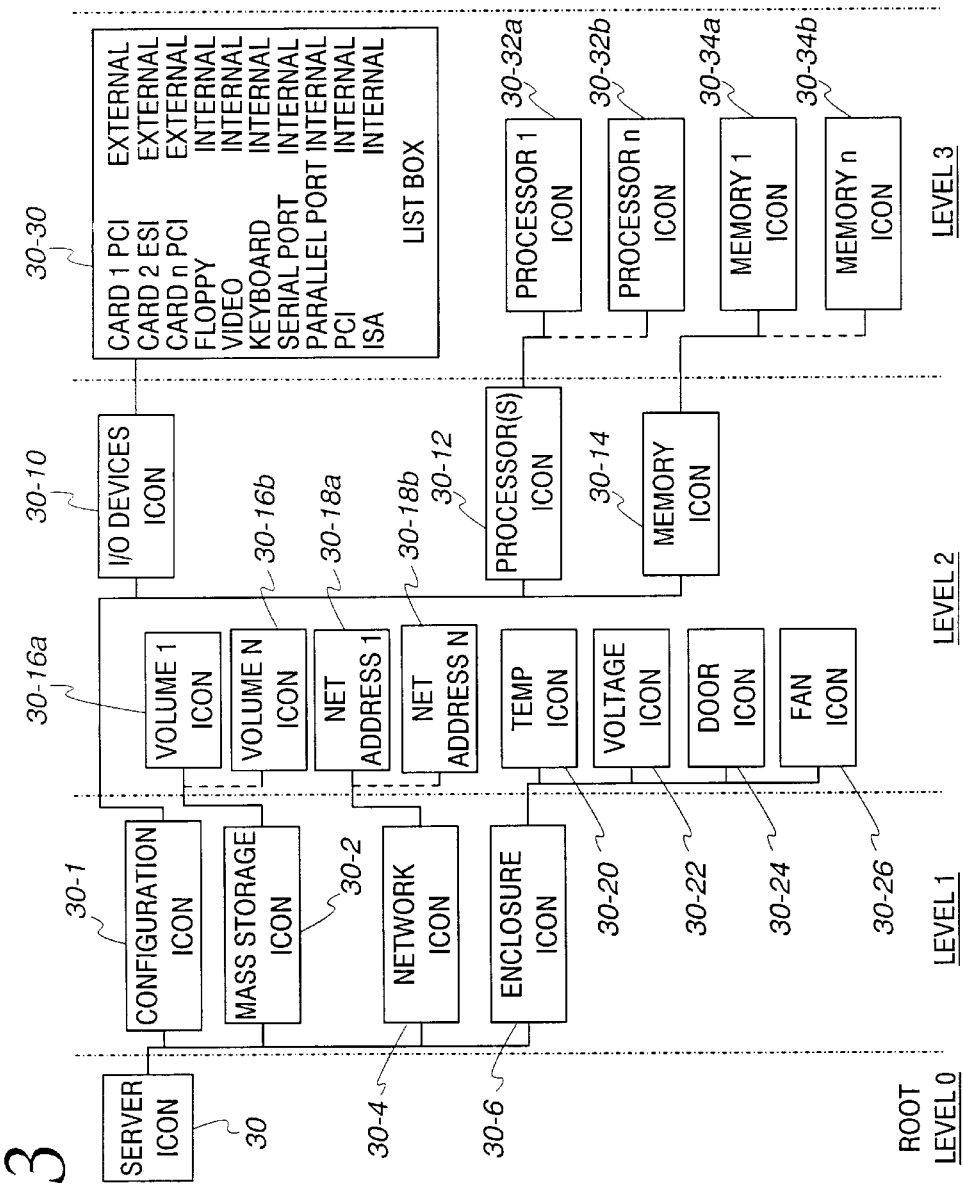
FIG. 3 is a representation of the navigation model of the present invention

FIG. 3 illustrates the hierarchical navigation model of the present invention. The model is so organized that an operator or user can move along the different branches of the tree structure and traverse through the major component areas of a given server by simply selecting and clicking on displayed component category icons representative of such areas. Upon such selection, the model either displays a next level of the selected component category or a dialog screen containing the requested information.

Additionally, at launch time, the navigation model provides an operator with visual alert information signaling when a trap event is pending within a major component area of the server. When a trap event is pending, the icon representing the major component area associated with the trap event will appear in red. When the operator selects and double clicks on the red colored icon, the navigation model presents the operator with the display screen associated with the trap. A Server Management Data Tables Section provides examples of such trap display information.

Considering the navigation model in greater detail as illustrated, the model is divided into five levels representative of a particular server model organization within a family of servers. The first level, labeled level 0, includes a server icon 30 which is a pictorial representation of the particular server. The Server Management Data Tables Section provides examples of information displayed at this level. The next level, labeled level 1, depicts the major component categories of the server model which as shown includes a configuration component category represented by configuration icon 30-1, a mass storage component category represented by a mass storage icon 30-2, a network component category represented by a network icon 30-4 and an enclosure component category represented by an enclosure icon 30-6.

The next level, labeled level 2, depicts the subcomponent categories within each of the major component areas of level 1. For the configuration category, the subcomponents include I/O devices subcomponents represented by an I/O devices icon 30-30, processor subcomponents represented by a processor icon 30-12 and memory subcomponents represented by a memory icon 30-14. For the mass storage category, the subcomponents include a number of logical volumes represented by icons 30-16a and 30-16b. For the network category, the subcomponents include a number of network addresses represented by icons 30-18a and 30-18b. Lastly, for the enclosure category, the subcomponents include temperature, voltage, door and fan subcomponents represented by icons 30-20, 30-24 and 30-26 respectively.

The last level shown in FIG. 3, labeled level 3, depicts the elements of each of the subcomponents in level 2. In the case of the I/O devices subcomponents, the navigation model presents the operator with a list box 30-30 which provides a listing of all of the I/O devices and their locations in terms of whether they are internal or external to the server. When the I/O devices icon 30-30 is selected and clicked on by the operator, this list box is displayed. Along with the device identification and location the operator is presented with information on its bus type (e.g. SCSI, PCI, ESIA, ISA), interrupt request (IRQ), DMA channel, Hi-ROM address, Low-ROM address, Hi-IO address, Low-IO address and the manufacturer's marketing identification for the device card. If the device supports additional components, such as a SCSI controller, then in response to selecting and clicking on such a list entry, the navigation model provides another level of detailed information pertaining such component.

From the above, it is seen that I/O device information is displayed at two levels. The first level of information relates to the configuration of the device itself and is used to populate the list box display. The second level of information relates to any external components that the device supports. The per device display screen is divided into two sections. The first section displays information common to all device irrespective of device type and manufacturer. The second section displays detailed information that is only relevant to a particular device type. The Server Management Data Tables Sections provides examples of such device display information.

When the processor icon 31-0-12 is selected and clicked on, the operator is provided access to information about the server's complement of processors as indicated above. If the server has a single processor, then in level 3, the navigation model will display a dialog box containing processor information. If the server has more than one processor, as in the case of FIG. 3, then in level 3, the navigation model displays icons depicting all of the processors available (e.g. icons 30-32a and 30-32b representing a server that has only two processors). Selecting and clicking on one of the processor icons 30-32a and 30-32b results in the navigation model displaying a screen depicting a dialog box containing all of the information pertaining to the selected processor. The Server Management Data Tables Section provides examples of such processor display information.

When the memory icon 30-14 is selected and clicked on, the operator is provided with access to information about the complement of memory boards on the particular server. If the server has a flat memory board, in response to the selection and clicking on the memory icon 30-14, the navigation model displays a dialog box containing information pertaining to the memory board. If the server selected has more than one memory board, as in the case of the server of FIG. 3, then in level 3, the navigation model will display icons depicting all of the available memory boards (e.g. icons 30-34a and 30-34b representing a server with two memory boards). Selecting and clicking on one of the memory icons 30-34a and 30-34b causes the navigation model to display a dialog box containing the information for the selected memory board. The Server Management Data Tables Section provides examples of such memory display information.

In the mass storage category, the subcomponents depicted are the number of logical volumes configured by the operating system for the specific server. If the server has a single logical volume configured, then the navigation model displays a graphic panel containing logical volume information. If the server has more than one volume configured, then the model will display graphic icons depicting all of the logical volumes configured by the server operating system (e.g. icons 30-16a and 30-16b) representing a server with two volumes configured). In response to selecting and clicking on one of the volume icons, the navigation model displays a graphic panel containing the information for the selected logical volume. The information from each logical volume residing on a server's fixed disk reported includes the total number of configured volumes, the ASCII volume name or drive letter, the configured size, the amount of free space, the percentage of space already used and a user configured hi-water mark above which a "volume almost full" trap event is sent. The Server Management Data Tables Section provides examples of such volume information In the network category, the subcomponents depicted provide logical information about the server's network connections. When the network icon 30-4 is selected and clicked on, the navigation model displays a list of network addresses such as those represented by network address icons 30-18a and 30-18b of FIG. 3. When the operator selects and clicks on one of the network address icons, the model provides a dialog screen which displays a selection screen containing a number of control buttons for enabling the operator to request either a graphic or table display, a poll interval and the data to monitor. The network information is obtained from the server's available management information bases (MIBs) located therein. The Server Management Data Tables Section provides examples of such network information.

In the enclosure category, the subcomponents depicted in level 1 give the operator access to information relating to the states of physical conditions within the server's enclosure. More specifically, when the enclosure icon 30-6 is selected and clicked on, the navigation model presents an operator with a display screen showing the set of icons 30-22 through 30-28 of FIG. 3 for separately defining the physical environmental conditions present within the enclosure pertaining to temperature, voltage, enclosure door status and enclosure fan.

When the temperature icon 30-20 is selected and clicked on, the navigation model presents the operator with display screen indicating the current temperature within the enclosure derived from temperature sensors located within the enclosure which is dependent upon server model type. For example, one server model (WG5) has only a single temperature sensor within the enclosure while another server model (MX) has two such sensors. The type of temperature information is illustrated in the Server Management.

An operator is able to view and change the upper/lower fatal/warming thresholds associated with each of the temperature sensors located within the enclosure. Also, the operator can view or reset historical statistics which are maintained and show counts of the number of times a given temperature threshold has been exceeded. In greater detail, the enclosure temperature display screen shows a graphic depicting a temperature gauge for each of the temperature sensors located within the enclosure. Each temperature graphic contains an arrow pointing within a scale representing the range of valid temperatures. Above the arrow is a numerical value indicating the current temperature. The graphic also shows the temperature thresholds which have been established for the associated sensor. The upper and lower warning thresholds are indicated by yellow portions of the temperature scale. Above these portions of the scale are the numerical values for the upper and lower thresholds. Similarly, the upper and lower fatal thresholds are indicated by red portions of the temperature scale with the associated numerical values displayed above the scale. The temperature display also includes a number of button controls associated with each sensor, such as an Auto, Update, Properties and Statistics.

Clicking on the Update control button on the temperature display screen causes the display to be updated with the latest values. Clicking on the Auto control button on the display screen causes the display to be automatically updated at a regular interval. As discussed herein, this interval can be set via the enclosure control icon 30-28. Clicking an the Properties control button on the temperature display screen of a given temperature sensor results in the navigation model providing a display screen showing the current values for temperature, the various thresholds and an indicator showing whether or not the sensor is enabled. The display screen information can be refreshed by clicking on the Update control button. The various thresholds can be changed by typing in a new value and clicking on an OK button on the Properties display screen. Similarly, an operator can enable or disable the temperature sensor by checking and unchecking a Sensor Enable box on the Properties display screen and then clicking on the OK button.

Clicking on the Statistics control button on the temperature sensor display screen results in the navigation model providing the operator with a display screen showing the historical counts of the number of times each of the thresholds has been exceeded. The operator can refresh the display by clicking on an Update control button contained in the Statistics display screen. Also, the operator can reset the historical counts to zero by clicking on a Reset control button contained in the Statistics display screen. Examples of the above information displays are provided in FIG. 5l.

When an operator clicks on the voltage icon 30-22 in level 2 of FIG. 3, the navigation model presents an operator with a display screen indicating the current voltage levels obtained from voltage sensors located within the server's enclosure. The voltage sensors include a Plus 12 voltage sensor, a Minus 12 voltage sensor, a Plus 5 voltage sensor, a CPU voltage sensor A, and a CPU voltage sensor B. The operator is able to view and change the upper/lower fatal/warning thresholds associated with each of the voltage sensors. The operator can also view or reset the historical statistics which are maintained to show counts of the number of times a given voltage threshold has been exceeded. Examples of voltage information is given in the Server Management Data Tables Section.

Similar to the temperature display screen, the enclosure voltage display screen shows a graphic depicting a voltage gauge for each of the voltage sensors located within the enclosure which is depended upon the type of server model. For example, one type of server (WG5) has sensors for plus 12 volts, minus 12 volts, plus 5 volts and CPU voltage A while another type server (MX) has sensors for plus 12 volts, minus 12 volts and plus 5 volts. Each voltage gauge graphic contains an arrow pointing within a scale representing the range of valid voltages. Above the arrow is a numerical value indicating the current voltage level. The graphic also shows the voltage thresholds which have been established for the associated voltage sensor. The upper and lower warning thresholds are indicate by yellow portions of the voltage scale. Above these portions of the scale are the numerical values for the upper and lower thresholds. Similarly, the upper and lower fatal thresholds are indicated by red portions of the voltage scale with the associated numerical values displayed above the scale. The voltage display screen also contains Auto, Update, Properties and Statistics button controls and the Properties and Statistics display screens contain controls which are used in the same manner as described in connection with the temperature Properties and Statistics display screens.

When an operator clicks on the door icon 30-24 in level 2 of FIG. 3, the navigation model provides an operator with information obtained from a door sensor located in the server's enclosure indicating whether the side panel door of the enclosure is open or closed. Rather than using a separate display screen for indicating door status, the navigation model depicts the status by the door icon itself That is, when the door is closed, the model displays to the operator, an icon depicting a closed door representation and when the door is open, the model displays an icon depicting an open door representation. An example of the type of information used to produce the appropriate door icon is given in the Server Management Data Tables Section.

When an operator clicks on the fan icon 30-26 in level 2 of FIG. 3, the navigation model provides the operator with information obtained from a fan sensor located in the server's enclosure indicating whether the enclosure ventilation fan is operational or has failed. As in the case of the door, rather than using a separate display screen for indicating fan status, the model displays status by the fan icon itself. When the fan is operational, the model displays an icon depicting an operational fan representation and when the fan has failed, the model displays an icon depicting a failed fan representation. An example of the type of information used to produce the appropriate fan icon is given in the Server Management Data Tables Section. Also, an example of the type of control information that controls the state of the enclosure information discussed above is also given in the Server Management Data Tables Section.

DESCRIPTION OF OPERATION

With reference to FIGS. 1 through 5l, the operation of the graphic interface of the present invention will now be described. The S-view manager application 10-6 graphic interface operates in response to different types of stimuli and the type of stimuli determines its operational flow. There are three basic operational flows, the operational flow initiated in response to the application 10-6 being launched, the operational flow initiated in response to user input and the operational flow initiated in response to trap events.
FIGS. 4a through 4d

FIG. 4a diagrammatically illustrates these different flows or phases of operation for the graphic interface and in particular, the navigation model of the present invention.
Initialization Process-FIG. 4b

The first operational flow which takes place is that pertaining to initialization. This flow is diagrammatically illustrated in FIG. 4b. As previously discussed, the S-view manager application 10-6 is integrated into the framework facility 10-4 and therefore, at least one instance of the framework facility 10-4 must be running on workstation 10. As indicated in FIG. 5a, this arrangement makes it possible for an operator to launch or startup the S-view manager application 10-6 by double clicking on a distinctive map icon associated with the particular server contained in the framework's network manager topology map and then selecting the relevant S-view manager entry from a popup menu. Additionally, as indicated in FIG. 5a, the S-view manager application 10-6 can also be started by pulling down a menu in HP OpenView framework facility.

In both cases, the framework facility 10-4 launches the S-view manager application 10-6 and then sends it a message indicating that a server was selected by the operator. In the present embodiment, only one server is monitored at any given time (i.e. termed the current server) and such server may be the same system running the framework facility 10-4 and S-view manager application 10-6. Upon being started, S-view application 10-6 first displays a splash screen for cosmetic purposes during the period of time required to initialize application 10-6. The screen also serves to hide the application's main window for the time interval required to construct the window. Since the processes of displaying and removing windows are well known, they will not be discussed in detail herein. Also, the same methods are used for displaying and removing windows in response to user input stimuli.

After having displayed the splash screen and having performed some initializing and housekeeping tasks, the application 10-6 sets an interval timer to establish a few second time-out interval for handling the situation when the application 10-6 is started directly and no message is sent by framework facility 10-4. The application 10-6 message loop then drops into an idle state, awaiting receipt of a message from framework facility 10-4 identifying which one of the server systems 1–N was selected by the operator.

When the framework 10-4 launches the application 10-6, it sends a message which results in one of the framework's control procedures (0vcommand or LButton DblClick) being triggered automatically. The triggered procedure in turn calls a first one of several load new server control procedures (LoadNewServer1) of application 10-6 included in block 10-80 of FIG. 2. In the case of a direct start, the operator causes one of the Visual Basic timer control procedures contained in the support libraries 10-60 to be triggered and this procedure in turn calls the first load new server procedure.

During the execution of the first load new server procedure, application 10-6 calls a control function in the framework facility 10-4 (XOVMapGetSelection) to find out what server was selected by the operator in the topology map of FIG. 5a. The application 10-6 also calls another framework facility control function (XOVBConfReadNetAddr) to obtain the selected server's IP address for the purpose of communicating with the selected server. It will be noted that some framework control functions return status values to application 10-6 indicating success or failure of particular operations. If the framework control functions just described return status indicating failure, the application 10-6 obtains an IP address representing the default server from a hard coded initialization file. A procedure that triggers automatically does not return a status value to application 10-6. When the framework 10-4 finishing its processing operations associated with the application 10-6, the application exits to the message loop and drops into an idle state.

The first get data request issued by application 10-6 to the selected server specifies an Object ID (OID) string which identifies the server model (e.g. MX, WL, etc.) but not uniquely. This string contains information such as the model name (e.g. server model MX, model number (e.g. 49144), major firmwarethardware revision (e.g. 144), minor hardware revision (e.g. 2), MIB revision (1.33), operating system and operating system revision. As discussed herein, these data values are used for model verification in terms of determining if the server system is running operating system software which is capable of interacting with the graphic interface of the present invention. Also, specific values of information (e.g. MIB revision) are used by the navigation model in dictating the type of visual display to present and other values are used in displaying textual boxes as discussed herein.

Application 10-6 issues the get request by calling one of its procedures (XOVBSnmpGet). At the time of the first data request, application 10-6 sets its state variable iStateG to a state specifying what is to be done with the requested data when it is received from the server system. After the completing the request, the load new server procedure returns to another procedure (Form_Load) which in turn exits causing the application 10-6 to return to its message loop wherein it drops into an idle state to await receipt of the requested information.

When the server replies to the first get data request by sending back the Object ID string, this triggers an SNMP reply control procedure in framework 10-4 (Snmp1_SnmpReply) which in turn calls an S-view control procedure to process the data. Before calling the S-view control procedure, the Snmp reply procedure performs a preliminary check of the summary status information passed to it and then calls another Snmp control procedure (XOVBSnmpFetchVarInfo) which actually retrieves the data. The state variable when set indicates that the application 10-6 call next control procedure (CallNext2) is to be called to process the requested data.

The SNMP reply procedure calls the procedure (CallNext2) which serves the function of a "jump table" in selecting a second load new server procedure (LoadNewServer2) as a next procedure to be dispatched when the requested data arrives. An example of the type of mapping performed by the CallNext2 jump table control procedure is illustrated below in the table III.

TABLE III

| STATE VARIABLE VALUE | | PROCEDURE TO BE CALLED | |
|---|---|---|---|
| LOAD2 | (2) | LoadNewServer2 | (stage 2 of initialization) |
| LOAD3 | (3) | LoadNewServer3 | (stage 3 of initialization) |
| LOADCPU2 | (22) | LoadCpuInfo2 | (store CPU data) |
| LOADMEM2 | (42) | LoadMemInfo2 | (store memory module data) |
| LOADLVOL2 | (62) | LoadLVolInfo2 | (store disk drive data) |

It will be appreciated that there are other control procedures such as LoadCpuInfo1, LoadMemInfo1, and LoadLVolInfo1 which are not included as part of this jump table are called by another similarly organized jump table control procedure (e.g. CallNext1). For further information regarding the use of jump tables, reference may be made to at the end of the source code Appendix which illustrates an execution sequence through a set of jump control procedures included in the Appendix.

The S-view application's second new server control procedure (LoadNewServer1) analyzes the data values contained in the Object ID string and obtains the server model information therefrom. As discussed herein, this information is used in the generation of navigation model display screens. Next, application 10-6 issues a second get data request by again calling the Snmp get data procedure (XOVBSnmpGet) at which time it again sets the state variable iStateG to a value identifying a third load new server control procedure (LoadNewServer3) as the procedure which is to process the server data when received in response to the second request. This data request specifies via OIDs, data values stored and maintained within the server system's MIB. The data values include general information, administrator information, system name and server location information which is used to uniquely identify the selected server. As discussed herein, these values are later used by the navigation model in displaying certain text boxes.

The third load new server procedure then exits to the call next procedure (CallNext2) which in turn exits to the framework's Snmp reply control procedure (SnmpReply). The load new server control procedure also calls a first call next control procedure (CallNext1) which is responsible for managing the application's queuing system. The queuing system comprises a group of arrays organized into two separate queues which are used to provide parallel storage for outstanding requests and data fetched from the server system. When the application 10-6 is not performing any tasks, it will attempt to drive the queue system just before returning to the message loop or idle state. For the purposes of the present invention, the queuing system can be considered convention in design.

Since no data has been queued at this time, the call next control procedure (CallNext1) does not have to perform any operations and thus, the framework Snmp Reply control procedure is allowed to exit causing the application 10-6 message loop to drop into an idle state. When the data is received from the server in response to the second get data request, the third load new server control procedure (LoadNewServer3) designated by the state variable iStateG is called to process the received data values.

Following such processing, the application 10-6 issues a third get request in the same manner as discussed above. That is, application 10-6 third load new server procedure makes another call to framework's SNMP control procedure (XOVBSnmpGet) and then exits in the same manner as described above and the application drops into an idle state. The third get request specifies various numeric data items via OIDs which define the physical characteristics of this particular server. The navigation model uses these data values in constructing a tree structure which is representative of the server according to the present invention as discussed herein in greater detail. When any one of these data values denoted by a specific set of OIDs is not available from the server, the S-view application 10-6 will receive an error status indication from the framework application 10-4 causing it to shut down. That is, the MIB revision for particular server model specifies that these data values should be available from the server and if they are not available, this signals an fault or error condition in which case, the navigation model can not be rendered operational.

The requested numerical data items include the following:
(a) the number of processors (CPUs);
(b) the number of cpu cards;
(c) the number of memory subsystems;
(d) the number of physical slots;
(e) the number of drive bays;
(f) the number of drive bays;
(g) the number of power supplies;
(h) the number of parallel ports;
(i) the number of serial ports;
(j) the number of I/O devices including SCSI host controllers;
(k) the cabinet (enclosure) door status (i.e. a zero value (0)=OK);
(l) the cabinet (enclosure) fan status (i.e. a zero value (0)=OK);
(m) system up time (in seconds denoting that boot occurred); and,
(n) door/fan enabled flag.

Initialization Process-Populating Tree Structure

Figure 4C:
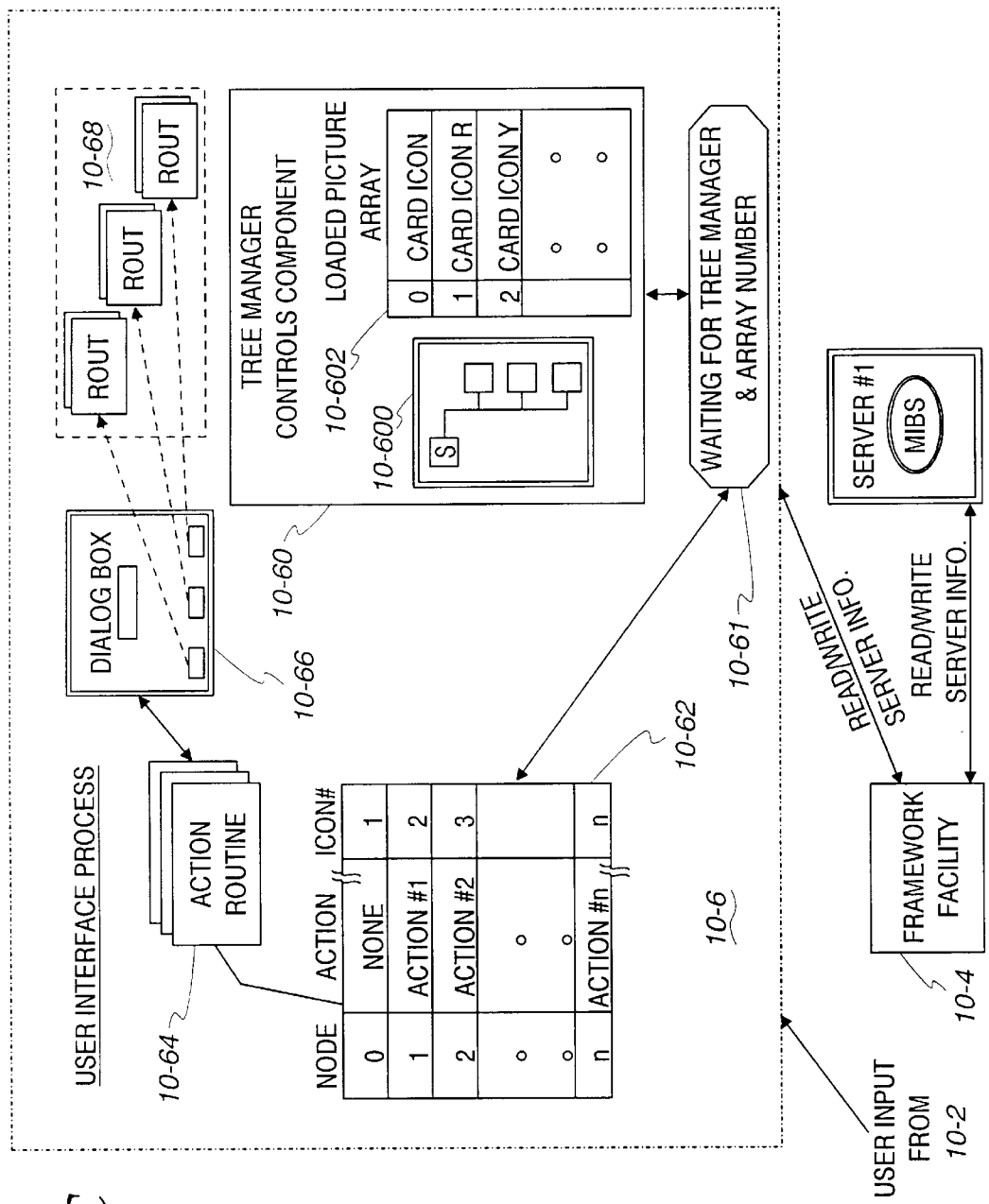
Figure 5A:
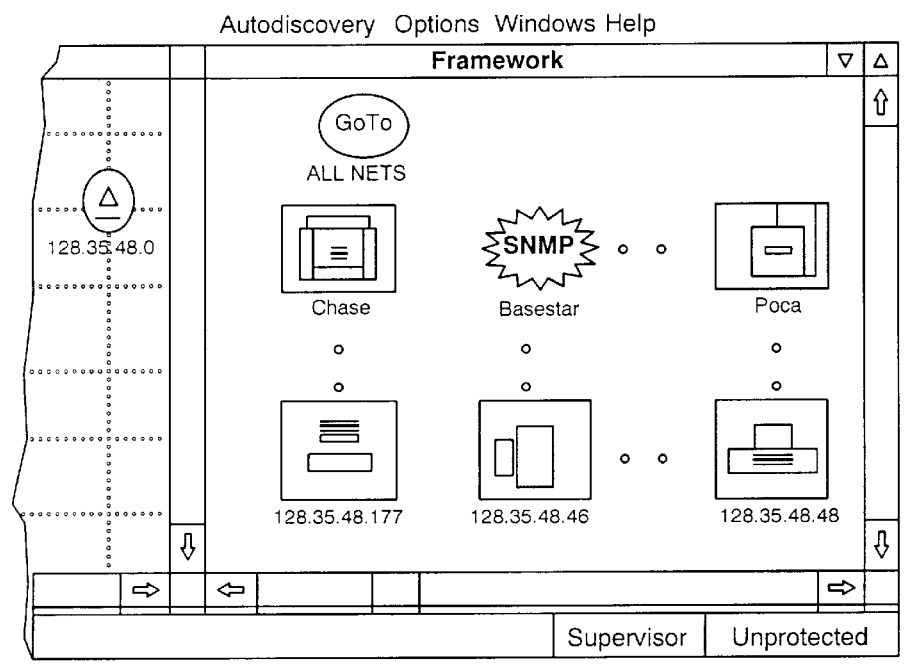
Figure 5B:
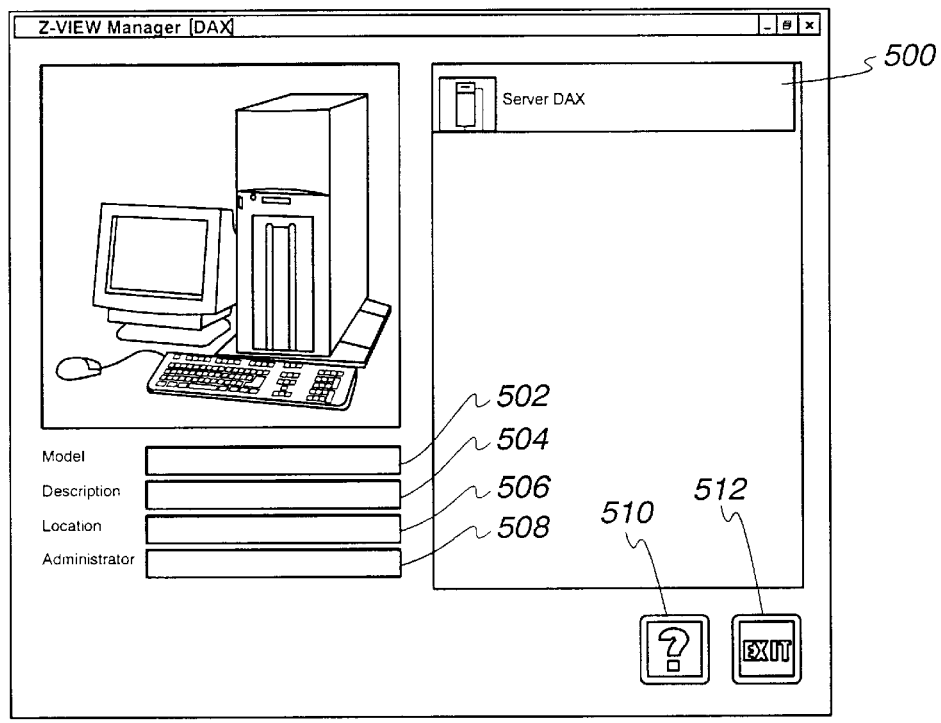

As discussed above, when application 10-6 is first started, the first screen displayed to an operator is a splash screen which is replaced at the completion of the population process by the opening window of the application which takes the form of FIG. 5b as discussed herein The configuration tree structure of tree manager controls 10-60 of FIG. 4b is empty when application 10-6 is first started. The application 10-6 custom populates the tree structure to reflect the categories and quantities of components and subcomponents in the server system being monitored. The tree structure is populated when the fourth load new server control procedure (LoadNewServer4) is called at which time the data values requested by the previously executed load new server control procedures (e.g. LoadNewServer2,3). Thus, the quantity of each component and subcomponent is known.

The navigation model uses the following procedures for displaying the different classes or categories of server components and subcomponents. If there are no components of a given class (e.g. disk drives), the navigation model omits that component from the displayed tree structure. If there is only one component of a given kind, then the navigation model positions the corresponding icon (e.g. logical disk volume, etc.) representing the component to be displayed once as a leaf element in the tree structure. When there are more than one component or subcomponent of a given class or category, then the navigation model positions the first icon representing that component to be displayed as an intermediate node and the icons representing the components to be displayed below the intermediate node as leaf elements. Thus, the tree structure describes the physical characteristics of the server in terms of the presence, absence and quantity of icons which reflect the presence, absence and quantity of the corresponding components and subcomponents in the particular server being managed.

The actual operations performed by application 10-6 in populating the tree structure will now be described relative to FIG. 5c which is a simplified version of the navigation model configuration tree of FIG. 3 for a server which is assumed to include only one disk drive and two processors (CPUs). As indicated above, the tree structure is populated when the fourth load new server control procedure (LoadNewServer4) is called. The first operation performed by the application 10-6 procedure is to load all of the possible icons (pictures) that might be displayed in the tree structure into the loaded picture array 10-600 of FIG. 4b. An example of the results of such operation is given above.

Figures 5C, 5D:
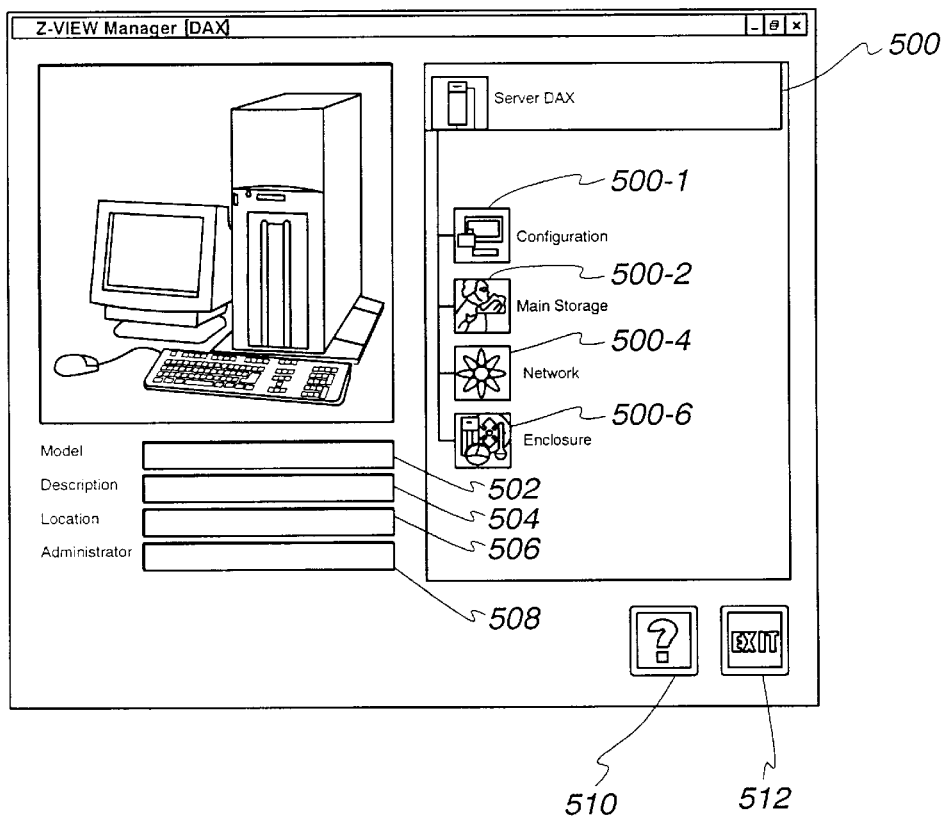
Figure 5E:
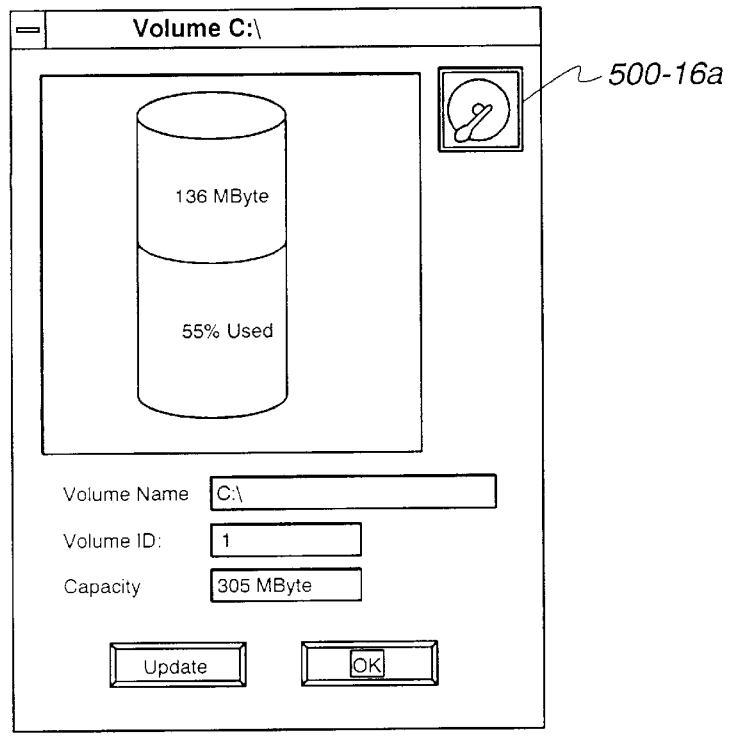

Referring to now to FIG. 5c, it is seen that the top line or node in the tree structure is the first element to be defined by the received server data values. This node is defined by filling in the appropriate information values in the first entry (#0) in each cell of the first row of arrays of action table 10-62 using an add node to tree control procedure (AddNode2Tree) of application 10-6. This results in the following information being stored in the first row of the action table 10-62:

1. What to do=0 value to indicate that no action is to be taken other than expanding the node when doubled clicked;

2. Level=0 value to designate the leftmost indentation level as the location of this node;
3. Unit no.=0 value to indicate that this is not applicable;
4. Parent index=0 value to indicate that the root has no children;
5. Condition=0 value to identify the gray version of the icon—all nodes start out with a gray color which may be later changed when updated by the event log;
6. Icon code=the color zone array index value for the gray picture of the closed server cabinet;
7. Been seen=0 value (not used with nodes that have children);
8. Key="server"
9. Label="Server" and the server's name (e.g. Server SMX3);
10. OID=no value since this node is never recolored by itself.

The node is inserted or placed into the tree structure when the S-view application 10-6 declares the level of indentation by first calling a tree manager AddItemColumn function and setting the level to a zero value. Next, the application inserts the caption "Server" by invoking an AddItem function and then the label value with the same function. The application then calls a tree ListPicture function which places the icon in the tree node to the left of the caption as shown in FIG. 5c. This completes the storage of the first node and if the tree structure were displayed at this time, the operator would see just one node corresponding to the root.

The other nodes including the lowest level leaf elements are added to the tree structure using control procedure AddNode2Tree in the order that they would appear when the tree structure is fully expanded as indicated in FIG. 5c. As shown, the next node that application 10-6 creates is node #1 which is a leaf node. A node is declared as a leaf element by tree manager 10-60 when the level of indentation of the next node is set to same location or to a location which is to the left of the previous node. By populating the tree structure with the next node so positioned, the tree manager 10-60 automatically positions the icon as a leaf element when the icon is doubled clicked by an operator (i.e. the convention used by the MicroHelp tree control mechanism).

Node #1 is added to the tree structure as a leaf element or node with no children by the AddNode2Tree function when the following entries are stored in the second row of the table 10-62:
1. What to do=an integer value (e.g. 516) to indicate that the action is to display the Logical Volume dialog box which results in calling one of the sets of routines of block 10-64;
2. Level=1 value to designate the next leftmost indentation level as the location of this node as being subordinate to the root;
3. Unit no.=1 value to indicate that this is the first disk drive;
4. Parent index=0 value to indicate that the root is the parent and is node #0;
5. Condition=0 value to identify the gray version of the icon—all nodes start out with a gray color which may be later changed when updated by the event log;
6. Icon code=5 which corresponds to the color zone array index value for the gray picture of the disk drive in array iaIconMapG as indicated in Table I;
7. Been seen=0 value to indicate the data for that node has not yet been seen;
8. Key=no value since this node has no children
9. Label="Logical Volume;
10. OID=a value such as 1.3.5.1 for searching the tree structure to determine which icon should be turned yellow or red in response to a trap event associated with a particular OID value.

The operation of adding node #1 to the tree structure is the same as described above except for setting the indent level to 1 using the tree structure AddItemColumn function. The tree ListPicture function when called places the icon in the tree node to the left of the caption as indicated in FIG. 5a. If the tree structure were to be expanded at this time, the tree structure would display the following nodes:
(picture) Server SMX3
(picture) Logical Volume.

Next, application 10-6 creates node#2 which is an intermediate node representing two processors (2 CPUs). The first processor node is a parent which has two children corresponding to the two CPUs. It is desired that when the tree structure is expanded to the first level, only the node for the logical volume (disk drive) and node for the CPUs are displayed. This is accomplished by storing the following entries in the third row for node #2:
1. What to do=0 value to indicate that no action is to be taken other than expanding the node;
2. Level=1 value to designate the next leftmost indentation level as the location of this node as being subordinate to the root;
3. Unit no.=0 value to indicate that this is not applicable;
4. Parent index=0 value to indicate that the root is the parent and is node #0;
5. Condition=0 value to identify the gray version of the icon—all nodes start out with a gray color which may be later changed when updated by the event log;
6. Icon code=44 which corresponds to the color zone array index value for the gray picture of the processor in array iaIconMapG as indicated in Table I;
7. Been seen=0 value since this array is not used with nodes that have children;
8. Key="cpu"
9. Label="CPUs";
10. OID=a blank value since this node is never recolored by itself.

Immediately following node #2, the entries for the two processors are stored in the fourth and fifth rows of table 10-62 as indicated in FIG. 5c. In the case of nodes #3 and #4, the following entries are stored:
Node #3
1. What to do=a value (e.g. 503) to indicate the action of displaying the CPU dialog box which results in calling one of the sets of routines of block 10-64;
2. Level=2 value to designate the next leftmost indentation level as the location of this node as being subordinate to the parent node #2;
3. Unit no.=1 value to indicate that this is processor #1;
4. Parent index=2 value to indicate that parent node is node #2;
5. Condition=0 value to identify the gray version of the icon—all nodes start out with a gray color which may be later changed when updated by the event log;
6. Icon code=44 which corresponds to the color zone array index value for the gray picture of the processor in array iaIconMapG as indicated in Table I;
7. Been seen=0 value to indicate that data for the node has not yet been seen;
8. Key=no value to indicate that this node has no further children;
9. Label="CPU #1";
10. OID=a value such as 1.3.6.1.
Node #4
1. What to do=a value (e.g. 503) to indicate the action of expanding the CPU dialog box which results in calling one of the sets of routines of block 10-64;

2. Level=2 value to designate that both children are on the same level;
3. Unit no.=2 value to indicate that this is the second processor;
4. Parent index=2 value to indicate that node #4 has the same parent, node #2;
5. Condition=0 value to identify the gray version of the icon—all nodes start out with a gray color which may be later changed when updated by the event log;
6. Icon code=44 which corresponds to the color zone array index value for the gray picture of the processor in array iaIconMapG as indicated in Table I;
7. Been seen=0 value to indicate that data for node #4 has not yet been seen;
8. Key=no value to indicate that this node has no children;
9. Label="CPU #2";
10. OID=a value such as 1.3.6.2.

Again, nodes #2, #3 and #4 are added and inserted into the tree structure in the same manner described above. At this point the populating the tree structure is complete. As shown, if the tree structure is displayed at this time fully expanded, it would appear as indicated in FIG. 5c.

The array numerical values indicating the number of processors, disk drives, etc., are also stored separately for reference. Also, other array variables such as the location of the first CPU icon in the tree structure, are separately maintained for purposes of cross reference because the node numbers may vary depending on what components the server system contains and their quantity. For example, in one server system, CPU #1 may be represented by node #3 (i.e. FIG. 5c) while in another server system (i.e. FIG. 3), CPU #1 may be represented by node #9.

Tree Structure Recoloring

After the tree structure arrays have been populated by procedure LoadNewServer4 and before dropping into the message loop idle state, application 10-6 reads the alarm event log 10-40, one record at a time by invoking a control procedure GetEntry contained in read log procedure module (RDLOG.DLL) of application 10-6 along with the components contained in the framework's database services. Each alarm log data base record is set up by the framework application 10-4 to store an additional line of information which is formatted as follows:

Trap # <trap no> (1) <first data> (2) <second data> (end) wherein the template needed to yield this line is as follows:

Trap #S $+1 (2)$+2 (end).

The trap no. corresponds to an integer having a value between 1 and 39. The first and second data items vary depending on the trap. For example, one data item may be the actual temperature reading considered to be out of limits and the data item may be a code for the limit (high or low) which was exceeded. Each record also contains a number of parameters which include a Flags parameter indicating if the entry has been acknowledged (i.e. 1=acknowledged) and an object name parameter identifying the server which signaled the trap. Alarm log records which do not have the correct format are ignored and records which have been acknowledged are not examined.

If an alarm or trap is found with respect to one of the components of FIG. 5c, such as the disk drive (Logical Volume), the OID of the alarm log record entry (i.e. 1.3.5.1) is used by the application 10-6 to search through the arrays of table 10-62. In this case, the application 10-6 locates that OID in the first entry for node #1. The application 10-6 modifies the condition code value (defining the gray colored icon) by adding the constant (zone size) to the stored value which results in the yellow colored or red colored icon code value.

When the icon color is so modified, the application 10-6 propagates the color back up to the root node by invoking a set tree alarm control procedure (SetTreeAlarm). In this manner, the navigation model is able to display the severity of an alarm or trap without having to expand the tree structure. In this example, the parent index value in the table entry indicates that node #0 is the parent and that it needs a color change. If the parent node is already displaying a more severe condition, its color is not changed. The order of pictures and designation of parent/child relationships are the same for all server systems and therefore, such ordering can be hardcoded into a LoadTree2 procedure (e.g. the fixed relationships between icons, such as the door icon coming after the fan icon in FIG. 3).

Thus, the populating of the tree structure is carried out in two steps: (1) filling in the arrays for each node in succession and (2) reading the alarm log entries, re-populating the tree structure while changing the coloring of the nodes as a function of what traps are stored in the event log 10-40. After populating is completed, the application 10-6 invokes a redraw tree function which redraws (i.e. clears the information contained in node array entry and reenters the node entry information) and re-populates the tree structure so that it now contains all the correctly colored icons. After this operation, the application removes the splash screen, presents the user with the screen represented in FIG. 5b and then drops into an idle state awaiting user input.

Processing User Input-FIG. 4c

As mentioned above, the opening window displayed to the operator takes the form of FIG. 5b. As indicated, only the root or top node of the tree is displayed in opening window and is represented by server icon symbol 500 (equivalent to icon 30 in FIG. 3) located on the right side of FIG. 5a. On the left side of FIG. 5b, the application 10-6 displays a picture of the server model along with labeled textual boxes 502 through 508 containing some of the previously requested server information. The navigation model selects the picture to be displayed based on the server model information included in the first data values received from the server system.

Also, the opening window screen includes several control buttons as shown in FIG. 5b The control buttons are a help button 510 and an exit button 512. An operator can exit application 10-6 by clicking on the exit button 512 or access help by clicking on the help button 510.

As indicated, when an operator selects the server icon 500 of the root node in the opening window screen and double clicks mouse pointing device 10-12, the navigation model expands the tree structure to the next level wherein the next screen displayed of a second window takes the form of FIG. 5d. As shown, the set of icons (i.e. 500-1 through 500-6 equivalent to icons 30-1 through 30-6 of FIG. 3) representative of the major components contained in the selected server system are displayed in addition to the server icon 500.

It will be appreciated that for the example discussed above in connection with tree structure population, the navigation model would only display the configuration icon 500-1 and server icon 500 in this window. In the textual boxes 502 through 508 of this window, the navigation model may also present the operator with different information (i.e. information pertaining to server model description, location and administrator) more specialized for server management in lieu of the textual information shown in FIG. 5b. As previously discussed, this information is also obtained from the server system during the initialization phase of operation.

The user phase of operation will first be discussed in greater detail relative to the tree structure of FIG. 5c. The tree manager control component 10-60 in FIG. 4c, as previously discussed, provides the following functionality for processing user requests. When an operator or user double clicks on a node, tree manager component 10-60 if not already expanded, expands to display only its child nodes or contracts if expanded, making all of its nodes disappear. At that time, a double click control procedure within block 10-80 (treServer_DblClick) is triggered which in turn allows application 10-6 to call a further procedure based on the operator's selection at that time.

As shown, at the outset, the operator is presented with an opening window having only one node (node #0) which is available for selection. With reference to tree structure illustrated in FIG. 5c, when the operator double clicks on server icon 500, the tree manager controls 10-60 responds by displaying on the next window screen, its two children corresponding to the icon 500-2 representing the server system's disk drive and a CPUs icon equivalent to configuration icon 500-1 representing the server system's group of two processors (i.e. CPU#1 and #2). In the tree structure of FIG. 5c, the configuration icon 500-1 was omitted from the example, for ease of explanation.

The operator's action triggers the tree controls component's double click procedure with an argument corresponding to the index value of the double clicked node (i.e. node #0) passed to it by the user interface 10-2 which in turn triggers the control procedure treServer_DblClick. This procedure takes the index value (0) passed to it and accesses the "what to do" array entry of table 10-62 in the first row previously populated for node #0 as specified by that index value. The application 10-6 finds that the node #0 what to do value specifies that no action is to be taken Therefore, application 10-6 takes no further action and exits to the message loop, dropping back into an idle state.

As discussed above, only leaf elements of the tree structure are given action actions other than "0". Thus, as described, double clicking on any parent node causes application 10-6 to take no action while double clicking on any leaf node causes application 10-6 to bring up a dialog box. If the operator next double clicks on the Logical Volume node #1 of FIG. 5c, this causes interface 10-2 to trigger the component 10-6 double click procedure along with passing it an argument corresponding to the action table index value (1) for node #1 which in turn triggers the treServer_DblClick procedure. Because node #1 has no children, no further expansion takes place (i.e. node #2 below it was given the same level of indentation). When application 10-6 accesses the "what to do" array entry in the second row of table 10-62, it finds a code value (e.g. 516) which specifies that the action required is to "display the logical volume dialog box". The double click procedure then calls a DetailIcon procedure which contains a jump table mechanism for mapping the different "what to do" code values to the particular chain of procedure calls required to bring up this dialog box. The chain of procedure calls in this example performs the following operations:

(a) sending a request for each disk drive/Logical Volume (i.e. only one) to be queued up for retrieving data from the server system;

(b) requesting the data for each disk drive using procedure Qsub, waiting for it until received as signaled by framework procedure SnmpReply and storing it using load procedures LoadLVolIfo1 and LoadLVolInfo2;

(c) putting the data for the selected disk drive in the logical volume dialog box using form load procedure frmLVol3; and;

(d) displaying the logical volume dialog box using display/form show control procedure Qdialog/frmLVolData3.Show.

The data fetched and stored for each logical volume is as previously discussed in connection with navigation model of FIG. 3. As indicated, the data for all of the volumes is fetched before the dialog box window screen is displayed for the first time. This allows an operator to conveniently switch from one volume to another using a "combo box" function labeled 500-16a in the Logical Volume dialog box display screen of FIG. 5e. The operator may modif the getting full threshold (high water mark) as discussed herein. In response to such modification, application 10-6 calls the framework XOVBSnmpSet procedure which in turn issues the SNMP set request to the server system causing the server system's agent software to set the getting full threshold to the specified value internally within the server system.

It will also be noted that the Logical Volume dialog box includes an update control button for retrieving the data for only the currently displayed logical volume. The update button when selected calls one of the chains of procedures of block 10-68 of FIG. 4c. This chain invokes control procedures Qsub, CallNext1 and LoadLVolInfo1 which queues up the request for retrieving the data. When the data is received back from the server system, application 10-6 invokes the chain of procedures SnmpReply, CallNext2 and RedrawVol which results in the Logical Volume dialog box being refreshed.

Continuing on with the example of FIG. 5c, it will be noted that double clicking on the first processor icon (CPUs) equivalent to configuration icon 30-1 in FIG. 3, causes tree manager control mechanism 10-6 to expand the tree structure to the next level (level 2) causing its two children nodes are displayed i.e. CPU#1 and CPU#2) as in FIG. 5c. In greater detail, the operator's action of double clicking on the CPUs icon of FIG. 5c causes the user interface 10-2 to trigger the application control procedure treServer_DblClick which is passed the index 2 value. Using this value, the procedure accesses the "what to do" array entry in the previously populated third row of table 10-62 associated with node #2. The application 10-6 finds that the node #2 "what to do" code value specifies that no action is to be taken (i.e. contains an action code=0). Therefore, application 10-6 exits to the message loop thereby dropping into an idle state awaiting further operator input.

If the operator double clicks on either one of the CPUs, this causes the procedure treServer_DblClick to access the "what to do" array entry in either the arrays of the fourth or fifth row of table 10-62. The application 10-6 finds that the node "what to do" code value specifies to "display the CPU#1/CPU#2 dialog box". The CPU dialog box is then brought up by application 10-6 using a chain of procedure calls as discussed herein.

Figure 5F:
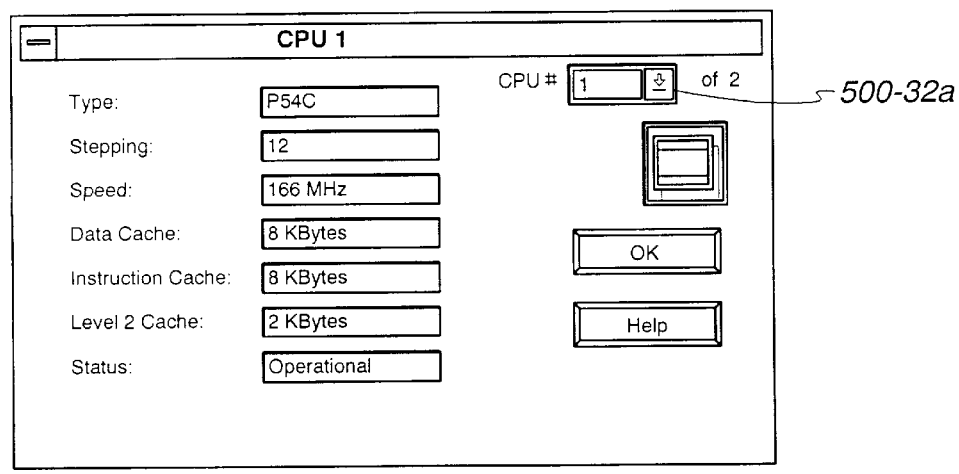

The dialog box displays data for one CPU at a time. An example of this type of display is shown in FIG. 5f. As indicated, all of the data is textual in nature. It is possible to display another CPU's information by selecting from within the CPU information dialog box already displayed without having to return to the tree structure. This is done by making selections from a so-called combo box 500-32a containing all of the CPU numbers which are available for that server system. To make this possible, the application 10-6 retrieves all of the data about all of the CPUs from the server system before the CPU dialog box is displayed for the first time. Once such data has been fetched, it is not fetched again as long as the same server is being managed.

More specifically, to fetch data for each CPU, application 10-6 places an entry in the queue system (data fetch queue)

using procedure Qsub which specifies that processor data is being requested along with the CPU number. Next, application 10-6 places an entry in the queue system (second queue) which specifies that the CPU information dialog box is being requested. Before dropping into an idle state, the application 10-6 calls procedure CallNext1 which sets in motion, the repeated execution of the following procedures included within block 10-68 of FIG. 4c:

CallNext1 (takes entry off queues, data fetch queue first);
LoadCpuInfo1 (sets up to request data for the next CPU);
XOVBSnmpGet (makes the actual data request) return, drop into idle;
SnmpReply (triggered when data request is fulfilled);
XOVBSnmpFetchVarInfo (retrieves all the data);
CallNext2 (decide which procedure will process the data);
LoadCpuInfo2 (stores the data for later use); and
before dropping into idle, call CallNext1 again to repeat the above procedures.

After all of the data has been fetched and stored, the queue system (data fetch queue will be empty. The last CallNext1 procedure call accesses the queue system and fetches the "display CPU information", invokes the dialog box procedure frmProcData3 and assuming that the queue system is empty, drops into the idle state. Meanwhile, processing for the frmProcData3 procedure begins with its Form_Load procedure (frmProcData3.Form_Load). This procedure takes the data just saved for the CPU whose icon was double clicked and displays it to the operator. The CPU information dialog box procedure exits, dropping into an idle state awaiting the operator's next action. For a more detailed list of these procedures, reference may be made to the example given below.

It will be noted that the CPU dialog box display screen of FIG. 5f also includes a help control button for displaying documentation, an OK control button for dismissing the dialog box and a switch control button to switch to another CPU when there is more than one CPU.

FIGS. 5g through 5l illustrate different window display screens used to describe the operations performed by application 10-6 in processing user icon selections involving I/O devices, memory and enclosure components in addition to their respective subcomponents. It will be assumed that during the initialization phase, the tree structure was populated so when fully expanded it displays a window display screen showing the fully expanded tree structure of FIG. 3 as being representative of the server system selected by the operator. In so doing, the arrays of table 10-62 were loaded with the appropriate values in a manner similar to that described in connection with FIG. 5c. Since the operations involving these components in many instances parallel the components described above, they will not be described in detail herein.

Figure 5G:
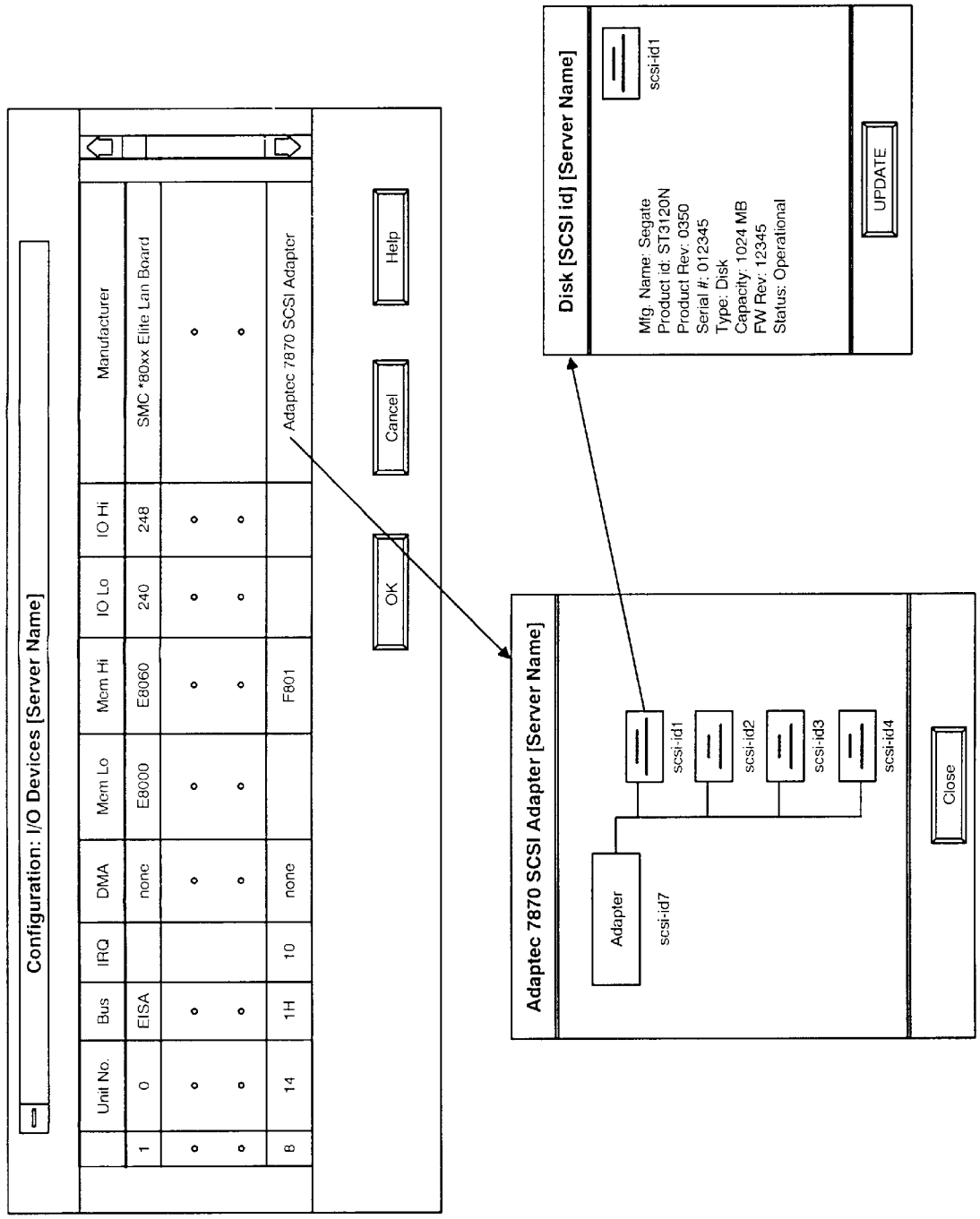

Referring FIG. 5g, it is seen that the I/O Devices dialog box window screen when activated displays information about the server system's I/O devices in tabulated form. This dialog box is displayed when an operator double clicks on the I/O devices icon 30-10 of FIG. 3. Such action caused the user interface 10-2 to provide a unique index value identifying the selected icon node which is passed to the application's treServer_DblClick procedure. This procedure accesses the "what to do" array entry of table 10-62 in the row previously populated for that icon node specified by the index value. The "what to do" code value specifies that the action required to be taken is to "display I/O devices dialog box". The procedure then calls the DetailIcon procedure which through its jump table, maps the action code value to the chain of procedure calls required to bring up this dialog box screen (frmDevices).

The chain of procedure calls also includes those procedures required to fetch all of the general information about I/O devices and all of the information for SCSI devices. This is done in the same manner as described for fetching CPUs data, starting with the application placing an entry in the queue system's data fetch queue by calling procedure Qsub for each I/O device and for each SCSI device. Also, one call is made to procedure Qdialog to queue up the request in the queue system's second queue which specifies to "display I/O devices dialog box". The application 10-6 then performs the same series of data request and data receive operations as performed for obtaining CPU data from the server system.

More specifically, the following steps are performed:

CallNext1 (takes entry off queues, data fetch queue first);
LoadIoInfo1 (requests data for the next I/O device);
(or LoadScsiInfo1);
return, drop into idle;
SnmpReply (triggered when data request is fulfilled);
XOVBSnmpFetchVarInfo (retrieves all the data);
CallNext2 (decide which procedure will process the data);
LoadIoInfo2 (stores the data for later use);
(or LoadScsiInfo2);
before dropping into idle, call CallNext1 again, to repeat the above chain of procedures.

The I/O data fetched from the server system is inserted into the bus type through device ID sections of the I/O devices dialog box as indicated in FIG. 5g. Thereafter, the I/O devices dialog box is displayed and the application drops into an idle state awaiting further operator input. If an operator double clicks on a row in the dialog box and the device associated with that row is not a SCSI host adapter (i.e. not row 7), application 10-6 then invokes another dialog box window display screen (fmIoDetail) for displaying more data for that selected I/O device. Since the data for this dialog box was fetched and stored earlier, application 10-6 does not have to issue any further XOVVSnmpGet calls. At this point in time, there are three windows active, all in an idle state awaiting further operator input. The windows are the main window, the I/O devices dialog box window and the dialog box window containing additional information for the selected I/O device.

When the operator clicks on a row containing information describing a SCSI host adapter, such as row slot 7 in FIG. 5g, application 10-6 invokes a dfferent type of dialog box window as indicated. As shown, this dialog box window screen contains a small tree structure provided by a custom control mechanism as described previously, wherein the root node of the tree labeled as being associated with device #7 which corresponds to the selected SCSI host adapter. The subordinate or its children nodes are shown as leaf elements represented by the icons labeled scsi-id1 through scsi-id4 and correspond to the SCSI devices attached to the SCSI host adapter. There is also a close control button which enables the operator to close the dialog box window.

To construct the tree structure of FIG. 5g, application 10-6 selects the SCSI data for each such device having the same host number included in the additional data fetched from the server system. The first SCSI device found by application 10-6 having a device type data item specifying "host adapter" is recognized as the host and the remaining SCSI devices are treated as subordinates. When an operator double clicks on a leaf element in the tree structure, this causes application 10-6 to call a chain of procedures to bring up a dialog box window screen (frmScsiDetail) containing information about that SCSI device, such as indicated in FIG. 5g. Since the information was fetched previously, application does not have to call control procedure XOVBSnmpGet.

It will be noted that this dialog box window display screen includes an update control button which when clicked on, enables the operator to request that only the data being displayed be again fetched from the server system. As discussed above, clicking on the update control button invokes one of the chains of control procedures of block 10-68 of FIG. 4c which causes the dialog box data to be refetched from the server system and displayed to the operator. If the SCSI device selected is a CD-ROM device and the CD has been removed from the server system, updating the dialog box window screen in this case will indicate that fact. At this time, application 10-6 has four active windows displayed, all in an idle state waiting for further operator input. These are the main widow, the I/O devices dialog box window, the host adapter dialog box window and the dialog box window containing additional information for the selected SCSI device.

When an operator clicks on either of the memory subsystem icons 30-34a or 34b of FIG. 3, application 10-6 determines from action table 10-62 that the action requested is "display memory dialog box". The application 10-6 fetches all of the data for all of the memory subsystem components (i.e. two) if not previously fetched because like the CPUs dialog box window, the memory dialog box window contains a combo box control which allows an operator to change this display to a different memory subsystem component without having to click on another icon in the tree structure. The application 10-6 calls a similar chain of procedures (i.e. Qsub, Qdialog, CallNext1, etc.) to fetch the required memory data as used to fetch CPU data. As in the case of fetching CPU data, the memory dialog box window (frmMemData3) is invoked after all of the memory data has been fetched from the server system.

Figure 5H:
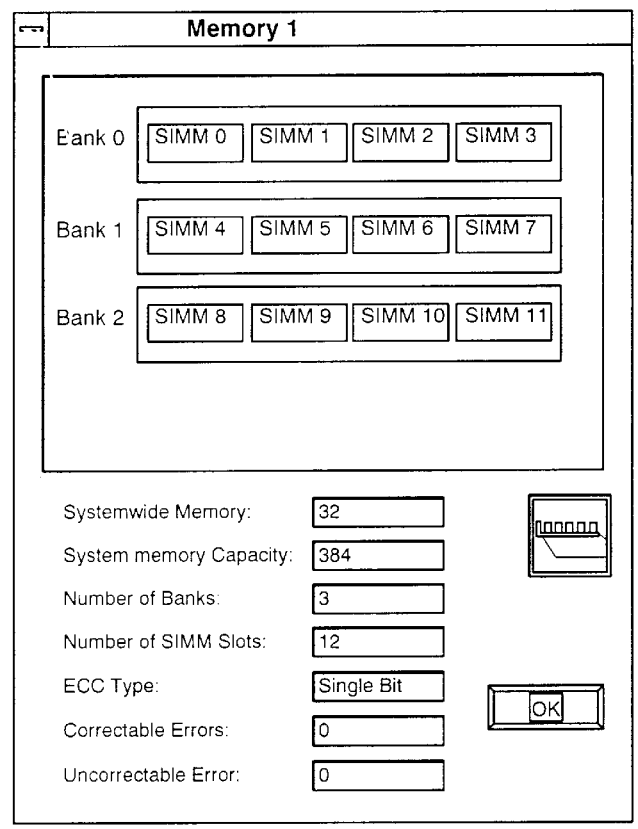

An example of the memory dialog box window is shown in FIG. 5h. As indicated, the memory dialog box window contains a diagram displaying as a separate row, each bank of SIMM modules of the memory subsystem component. Such component corresponds to all of the SIMM socket contained in the server system's motherboard or on any one expansion card. The dialog box window also includes a plurality of text boxes for displaying the following data items:

systemwide memory size;
memory capacity for this memory subsystem;
number of banks (socket groups) on this memory subsystem;
total number of SIMM sockets on this memory subsystem;
ECC type;
last systemwide correctable error;
last systemwide uncorrectable error;
total systemwide correctable errors; and
total systemwide uncorrectable errors.

In the diagram of the memory dialog box window displayed, the colors green, yellow and red are used to signal alarm conditions. More specifically, correctable errors are displayed in red and reported by the server system as pertaining to the specific SIMM module which is displayed in yellow. Uncorrectable errors are shown in red and are reported as pertaining to the entire bank which is displayed in red. The SIMM module sockets are consecutively numbered as indicated in FIG. 5i.

Figure 5I:
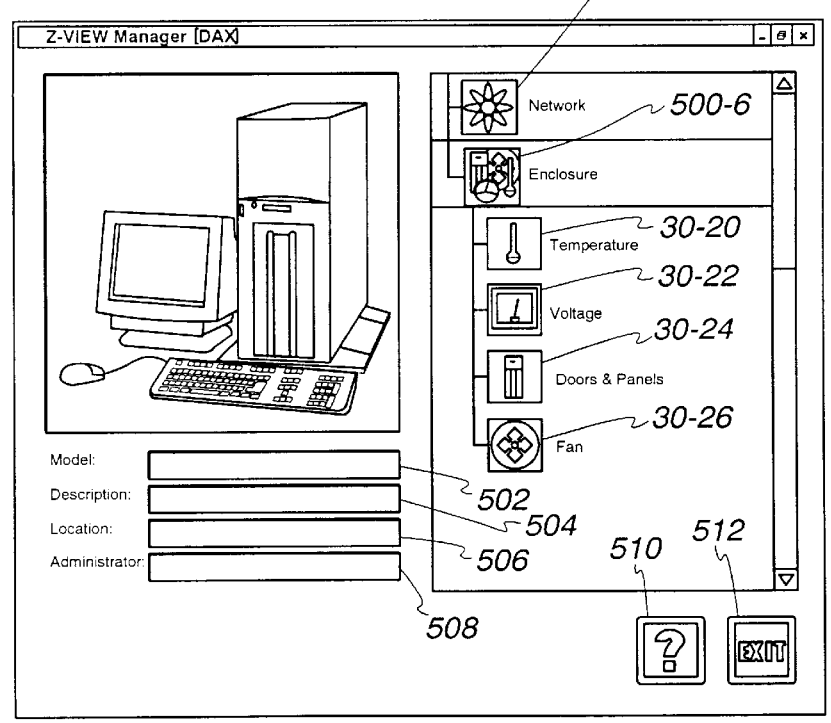

Referring now to FIG. 5i, when an operator selects the enclosure icon (i.e. icon 30-6 of FIG. 3, application 10-6 expands the tree structure to the next level in response to accessing a "zero value" action code from action table 10-62. This results in the display of a window screen containing the temperature, voltage, doors and panels and fan icons as shown in FIG. 5i. When the operator double clicks on the fan or door icon, application 10-6 determines that the action specified by table 10-62 is to "display dialog box" and immediately fetches the appropriate information form the server system to update the condition or status of either the fan or door component as displayed. As discussed above, since the double clicking action is inherently unreliable, application 10-6 displays a dialog box indicating the status of the fan or door rather than just changing the color of the icon. This arrangement ensures that the operator is able to distinguish between the status displayed initially and the status returned by the server system due to a failed double click action.

Application 10-6 calls a similar chain of procedures as described above for displaying the dialog box window. That is, it calls control procedure LoadOneInfo1 which in turn calls XOVBSnmpGet and then drops into an idle state to await receipt of the requested data from the server system. When the data is received, this triggers control procedure SnmpReply which later results in a call to control procedure LoadOneInfo2 for displaying the specified dialog box window such as shown in FIG. 5j.

As indicated, the displayed dialog box window includes an appropriate icon which is colored to indicate its status and a short message (e.g. fan is running/door is closed). When the latest condition reported by the server system requires attention (i.e. fan stopped/door open), application 10-6 responds by displaying both the icon in the dialog box window and the icon that was clicked on in the color red. Alternatively, both icons are displayed in a green color indicating that the condition has been updated and does not require attention (i.e. status is good).

When the operator double clicks on either the voltage or temperature icon of FIG. 5i, application 10-6 determines from the action code in action table 10-62 that the required action is to "display dialog box". In response to double clicking on the voltage icon, application 10-6 displays one dialog box window screen (frmVoltage3) which shows all of the power supply voltages represented by simulated semicircular shaped gauges as illustrated in FIG. 5k. In response to double clicking on the temperature icon, application 10-6 displays one dialog box window screen (frmThermal3) which shows the temperature(s) measured inside the server system cabinet/enclosure represented by gauges sinilar to the voltage gauges as illustrated in FIG. 5k.

The process of fetching and displaying of data for the temperature dialog box window is the same as the process used for the voltage dialog box window. As previously discussed in connection with FIG. 3, a server system can have up to five voltage sensors and two temperatures sensors. When an operator doubles clicks on the voltage icon in the tree structure of FIG. 5h displayed for a server system having all five sensors present, application 10-6 places the following requests into the queue system data fetch queue:

Request for LoadVoltInfo1 (+12 V data);
Request for LoadVoltInfo3 (+5 V data);
Request for LoadVoltInfo5 (CPU voltage A data);
Request for LoadVoltInfo7 (−12 V data); and
Request for LoadVoltInfo9 (CPU voltage B data).

Application 10-6 places another set of requests to display voltage panels on the queue system's second queue. The application 10-6 as a function of server system model only issues requests for the sensors present in the server system (i.e. has customized paths to omit data requests for sensors not present in the server system.

Then application 10-6 invokes a chain of procedure calls similar to that used to fetch CPU information beginning with a call to control procedure CallNext1. When the data requested by control procedure LoadVoltInfo1 arrives, application 10-6 calls procedure LoadVoltInfo2. Similarly, when the data requested by procedure LoadVoltInfo3 arrives, application 10-6 calls procedure LoadVoltInfo4, etc. This process continues wherein the odd numbered Load procedures make SNMP requests and the even numbered Load procedures store the data upon receipt.

The sequence of procedures are as follows:

CallNext1 (takes entry off queues, data fetch queue first);

LoadVoltInfo1 (requests data for a voltage sensor);

return, drop into idle;

SnmpReply (triggered when data request is fulfilled);

XOVBSmnpFetchVarInfo (retrieves all the data);

CallNext2 (decides which procedure will process the data);

LoadVoltInfo2 (stores the data for later use);

CallNext1 (takes entry off queues, data fetch queue first);

LoadVoltInfo3 (requests data for another voltage sensor); return, drop into idle;

SnmpReply (triggered when data request is filfilled);

XOVBSnmpFetchVarInfo (retrieves all the data);

CallNext2 (decides which procedure will process the data);

LoadIoInfo4 (stores the data for later use);

CallNext1 (takes entry off queues, data fetch queue first); and

LoadVoltInfo5 (requests data for another voltage sensor).

After all of the requests have been removed from the queue system, application 10-6 issues one more call to the CallNext1 procedure which takes the "display voltage paner" request and invokes the voltage dialog box window (fmVoltage).

In the case of the temperature dialog box window, application 10-6 stores the following requests in the queue system:

Request for LoadThemrInfo1 (lower sensor);

Request for LoadThermInfo3 (upper sensor); and

Request to display temperature panel (put on second queue).

The process for fetching data for the temperature dialog box window is the same as that used for the voltage dialog box window. As in the case of the voltage sensors, when the server system model does not have a particular temperature sensor, application 10-6 includes custom paths which omit issuing a request for that data in the queue system.

When a voltage or temperature is not enabled, application 10-6 calls a procedure DrawSpeedom3 which displays a gauge having a gray scale, no needle or numerical information. When the sensor is enabled and the thresholds are in ascending order, application 10-6 calls a procedure DrawSpeedom2 which displays a gauge with a scale containing red, yellow and green colors wherein red is used for values beyond the fatal thresholds, yellow for values beyond the warning thresholds and green for values in the normal range.

As previously discussed, the voltage and temperature window display screens contain an update control button for each gauge. When an operator clicks the update button, application 10-6 fetches the data for the selected sensor by first queuing up a request to fetch data for the specified sensor by calling the appropriate load procedure (e.g. LoadVoltInfo1) and then queuing up a request to update the gauges of the dialog box window.

When an operator clicks on the Properties control button displayed on one of the temperature or voltage gauge panel screens of FIG. 5k or 5l, application 10-6 responds by displaying the Properties dialog box window (frmSensorProp) showing the current reading and the current thresholds. When an operator clicks the Properties button for another gauge on the screen while the dialog box window is being displayed, application 10-6 overwrites the contents of the dialog box window with the data for the newly selected gauge.

When one of the five threshold data items of a voltage/temperature dialog box window of either FIG. 5k or 5l along with the enable/disable indicator is changed by an operator, application 10-6 sets a flag for the changed item This allows application 10-6 to only request that new values be sent to the server system which is accomplished by invoking procedure XOVBSnmpSet when the Change button is clicked on by the operator. When so clicked, application 10-6 queues up requests to fetch the data again for that gauge and for redrawing it. Both the Properties dialog box window and the panel of gauges are redrawn by application 10-6.

When the statistics button of either FIG. 5k or 5l is clicked on by an operator, application 10-6 displays a dialog box window (frmSensorStat) showing the number of threshold violations for the specified gauge. If an operator clicks on the statistics button associated with another gauge while the dialog box window is being displayed, application 10-6 overwrites the contents of the dialog box window. The reset control button in the statistics dialog box window is used to zero out the violation counters. When the button is selected, application 10-6 issues a call to procedure XOVBSnmpSet to modify that data item in the server system.

Figure 4D:
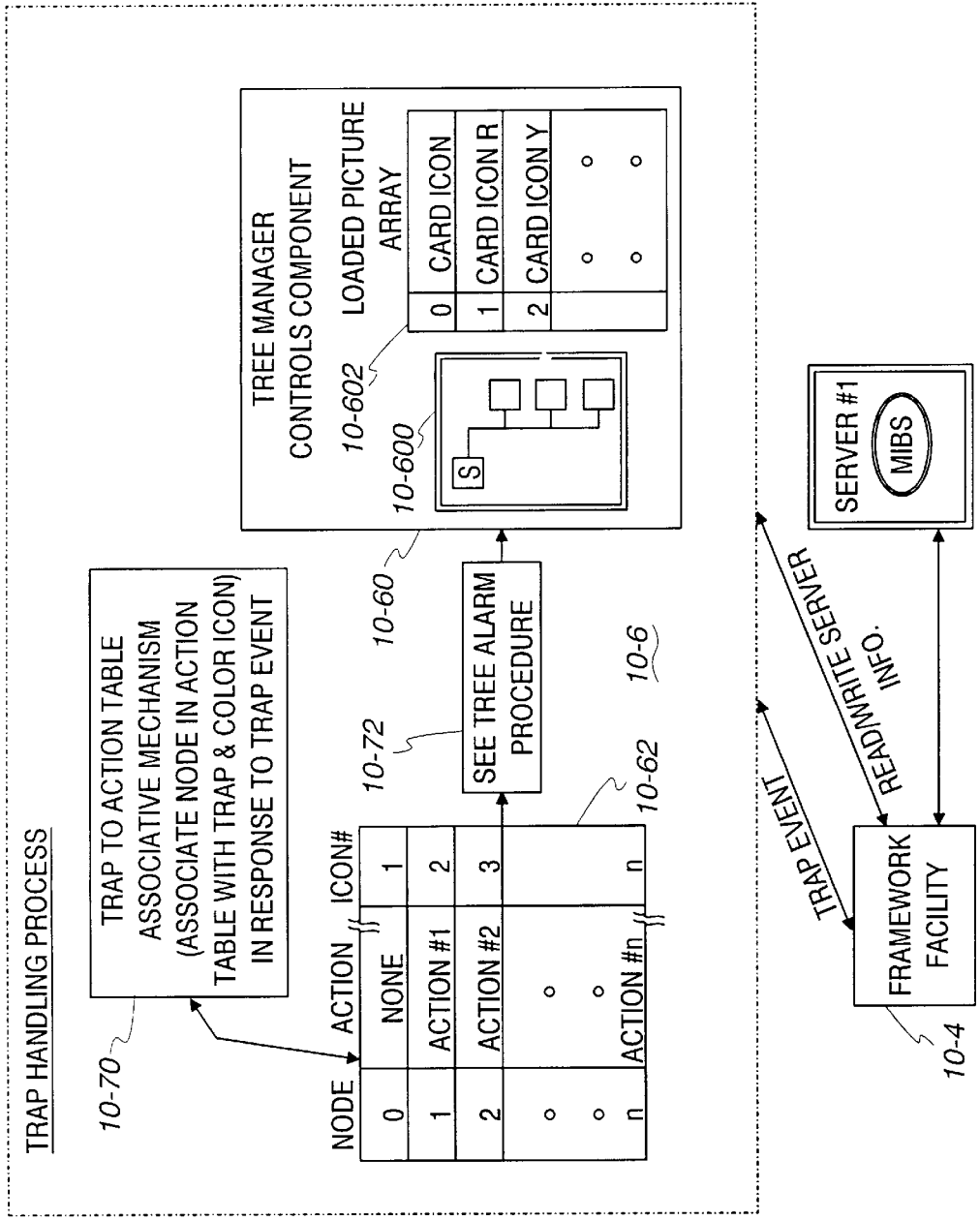

Processing Traps-FIG. 4d

As previously mentioned, application 10-6 during the initialization process updates the icons with alarm/trap event information stored in the event log 10-40. During each session of running application 10-6, the framework application 10-4 stores in the event log 10-40, any alarms received from each of the server systems and signals application 10-6 of such occurrence by calling control procedure SnmpTrap. This procedure is only triggered when application 10-6 is in an idle state or drops into an idle state as indicated by block 10-80 of FIG. 4d. In response to such notification, application 10-6 calls procedures XOVBSnmpFetchTrapInfo and XOVBSnmpFetchVarInfo to fetch the desired data describing the trap condition as graphically illustrated in FIG. 4d.

The framework application 10-4 passes to application 10-6 either all or none of the alarms having a specific enterprise ID value whose form resembles an IP address. Since many server systems are assigned the same enterprise ID value, application 10-6 examines each alarm entry record and selects each alarm record containing the name or IP address of the particular server system being managed during the session. Additionally, application 10-6 selects only those alarm records that represent traps relevant to the operation being performed in conjunction with that server system.

Application 10-6 records the newly received traps in allocated arrays addressable by vectors. More specifically, traps pertaining to voltage and temperature items are stored in an array designated by the same vector (faOffendlimG, etc.) which is used to store similar traps previously obtained from event log 10-40. Any new memory traps pertaining to memory module items are added by application 10-6 to an array designated by the same vector (iaMemRtrapsG, etc.) which is used to store memory traps previously obtained from event log 10-40. Application 10-6 allocates additional array storage by enlarging the array vectors as required for storing all of the memory traps for all of the server system's memory subsystem components.

When an operator double clicks on an icon such as a memory subsystem icon, application 10-6 analyzes the contents of the memory trap arrays and identifies those traps pertaining to that memory subsystem component and brings up the memory dialog box window screen displaying those trap conditions. More specifically, when the traps come in during a session, application 10-6 determines the affected nodes using associative mechanism 10-70 of FIG. 4d which relates the specific trap to a particular node and then invokes the procedure SetTreeAlarm to change the color of each node icon in the tree structure of FIG. 3 associated with the trap condition, to immediately signal the operator of the trap condition.

Also, application 10-6 sets the color of the parent node for that component/subcomponent to the color representing the "worst" or most severe among the different child node conditions (e.g. a memory uncorrectable error is more severe than a memory correctable condition). Application 10-6 determines the most server condition by examining the "conditioe" code values contained table 10-62 of the entries related to the group of nodes identified by the parent index code of such entries.

As indicated above, application 10-6 uses the same status coloring method for all icons. Initially icons having no reported alarm/trap conditions are displayed with a gray background color. The gray background indicates that the status of the component represented by the icon is normal and had no history of a triggered alarm when application 10-6 was launched. If something is wrong and an alarm is triggered by the agent management software on the server system being monitored, application 10-6 displays the corresponding icons with a yellow or red background color depending on the severity of the problem that occurred. The change in color is propagated hierarchically along the tree structure so the problem can be seen even when the tree structure is viewed in its fully collapsed state. Application 10-6 displays icons with a green background color for indicating to the user that an existing trap condition no longer exist in the case where an operator has taken action to correct the problem and then clicks on an update button associated with the particular server system component and application 10-6 fetches new data indicating that the trap condition no longer exists.

Application 10-6 automatically updates the windows to signal the presence of trap conditions for data, voltage, disk storage etc. server components only when an operator clicks on an update button displayed in the associated dialog box window screen. Those traps displayed during a session and not acknowledged by the operator through framework application 10-4 are reexamined by application 10-6 as part of rereading event log 10-40 when the operator clicks on the new server button of the main window display screen or when application 10-6 is shut down and relaunched.

From the above, it is seen how the hierarchical tree structure navigation model included as part of graphic interface of the present invention enables a user to efficiently manage a number of server systems. As required, the model can be easily expanded to accommodate additional server systems having different components and subcomponents. The model organizes server component/subcomponent information in a manner which allows a user to easily walk down through the different levels of a server system to view information describing the components and subcomponents and their operational status. The model also allows identification of important status conditions at a very high level within the tree structure through color rendering. This enables a user to look at the tree structure at this level and immediately know when a problem is present within the server system.

It will be appreciated that many changes may be made to the preferred embodiment of the present invention without departing from its teachings. For example, while the model was implemented as an event driven model with the Visual Basic programming language, it could also be implemented using other programming languages such as C++. Also, the architectural organization of the present invention may be used with other types of framework systems or used as a stand alone application.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

SERVER MANAGEMENT DATA TABLES SECTION
SERVER SYSTEM INFORMATION TABLE
*(Name preface) = zSvMIBSv   #(OID Preface) = 1.3.6.1.4.1.1743

| Name & OID | Information | Type | Value | Display |
|---|---|---|---|---|
| *OperatingSystem #.1.1.1.9] | OS Name | Display String | Operating System Name | Display String |
| *OperatingSystem Rev [#.1.1.1.10] | OS Revision | Display String | Operating System Rev | Display String |
| *ProductID #.1.1.1.2] | OID defining Server Type | OID | #.1.1.2.1 Zserver ES #.1.1.2.2 Zserver MX #.1.1.2.3 Zserver WG #.1.1.2.4 Zserver WL #.1.1.2.5 Zserver P6 | Internal Control |
| MANAGER DATA | Representative Server Image | File | Generic ZDS Server GIF File | Server Picture |

TRAPS INFORMATION TABLE
*(name preface) = zSvMIB    # (OID preface) = 1.3.6.1.4.1.1743.1.1.15

| Trap Name & OID | Significance of Trap | Enterprise Specific Trap # | Trap Variables (see cited section for variable information) |
|---|---|---|---|
| *TpUserHiTemp1 #.1 | Lower cabinet temperature is above user set high water mark | 1 (Deprecated) | *EvTemp1 |
| *TpUserLoTemp1 #.2 | Lower cabinet temperature is below user set low water mark | 2 (Deprecated) | *EvTemp1 |
| *TpUserHiTemp2 #.3 | Upper cabinet temperature is above user set high water mark | 3 (Deprecated) | *EvTemp2 |
| *TpUserLoTemp2 #.4 | Upper cabinet temperature is below user set low water mark | 4 (Deprecated) | *EvTemp2 |
| *TpDoorOpen #.5 | Cabinet Server Doors Have been Opened | 5 | |
| *TpFanFailure #.6 | Cooling Fan Has Failed | 6 | |
| *TpMemRed #.7 | A non-recoverable memory error has occurred | 7 | *hsMemReds (2.3.1) *EvSIMMRerr0 (2.3.1) |
| *TpMemYellow #.8 | A recoverable memory error has occurred | 8 | *hsMemYellows (2.3.1) *EvSIMMYerr0 (2.3.1) |
| *TpVolumeAlmost-Full #.11 | A Disk Volume's utilization is above its high water mark | 11 | *stVolumeName (3.1.2) *stVolumeUsed (3.1.2) |
| *TpTemp1 FatalHi #.12 | Lower cabinet temperature has reached its upper fatal limit | 12 | *EvTemp1Centigrade (5.1.1) *hsADC5FatalUpperLimit (5.1.1) |
| *TpTemp1 FatalLo #.13 | Lower cabinet temperature has reached its lower fatal limit | 13 | *EvTemp1Centigrade (5.1.1) *hsADC5FatalLowerLimit (5.1.1) |
| *TpTemp2 FatalHi #.14 | Upper cabinet temperature has reached its upper fatal limit | 14 | *EvTemp2Centigrade (5.1.1) *hsADC6FatalUpperLimit (5.1.1) |
| *TpTemp2 FatalLo #.15 | Upper cabinet temperature has reached its lower fatal limit | 15 | *EvTemp2Centigrade (5.1.1) *hsADC6FatalLowerLimit (5.1.1) |
| *TpPlus12V FatalHi #.16 | Plus 12 Voltage level has reached its upper fatal limit | 16 | *EvPlus12Millivolts (5.2.1.1) *hsADC1FatalUpperLimit (5.2.1.1) |
| *TpPlus512V FatalLo #.17 | Plus 12 Voltage level has reached its lower fatal limit | 17 | *EvPlus12Millivolts (5.2.1.1) *hsADC1FatalLowerLimit (5.2.1.1) |
| *TpNeg12V FatalHi #.18 | Negative 12 Voltage level has reached its upper fatal limit | 18 | *EvNeg12Millivolts (5.2.2.1) *hsADC4FatalUpperLimit (5.2.2.1) |
| *TpNeg12V FatalLo #.19 | Negative 12 Voltage level has reached its lower fatal limit | 19 | *EvNeg12Millivolts (5.2.2.1) *hsADC4FatalLowerLimit (5.2.2.1) |
| *TpPlus5V FatalHi #.20 | Plus 5 Voltage level has reached its upper fatal limit | 20 | *EvPlus5Millivolts (5.2.3.1) *hsADC2FatalUpperLimit (5.2.3.1) |
| *TpCPUAV FatalHi #.22 | CPU A Voltage level has reached its upper fatal limit | 22 | *EvCPUAMilliVolts (5.2.4.1) *hsADC3FatalUpperLimit (5.2.4.1) |
| *TpCPUAV FatalLo #.23 | CPU A Voltage level has reached its lower fatal limit | 23 | *EvCPUAMillivolts (5.2.4.1) *hsADC3FatalLowerLimit (5.2.4.1) |
| *TpCPUBV FatalHi #.24 | CPU B Voltage level has reached its upper fatal limit | 24 | *EvCPUBMillivolts (5.2.5.1) *hsADC7FatalUpperLimit (5.2.5.1) |
| *TpCPUBV FatalLo#.25 | CPU B Voltage level has reached its lower fatal limit | 25 | *EvCPUBMillivolts (5.2.5.1) *hsADC7FatalLowerLimit (5.2.5.1) |
| *TpTemp1 WarnHi #.26 | Lower cabinet temperature has reached its upper warning limit | 26 | *EvTemp1Centigrade (5.1.1) *hsADC5WarningUpperLimit (5.1.1) |
| *TpTemp1 WarnLo #.27 | Lower cabinet temperature has reached its lower warning limit | 27 | *EvTemp1Centigrade (5.1.1) *hsADC5WarningLowerLimit (5.1.1) |

-continued

TRAPS INFORMATION TABLE
*(name preface) = zSvMIB   # (OID preface) = 1.3.6.1.4.1.1743.1.1.15

| Trap Name & OID | Significance of Trap | Enterprise Specific Trap # | Trap Variables (see cited section for variable information) |
|---|---|---|---|
| *TpTemp2 WarnHi #.28 | Upper cabinet temperature has reached its upper warning limit | 28 | *EvTemp2Centigrade (5.1.1) *hsADC6WarningUpperLimit (5.1.1) |
| *TpTemp2 WarnLo #.29 | Upper cabinet temperature has reached its lower warning limit | 29 | *EvTemp2Centigrade (5.1.1) *hsADC6WarningLowerLimit (5.1.1) |
| *TpPlus12V WarnHi #.30 | Plus 12 Voltage level has reached its upper warning limit | 30 | *EvPlus12Millivolts (5.2.1.1) *hsADC1WarningUpperLimit (5.2.1.1) |
| *TpPlus12V WarnLo #.31 | Plus 12 Voltage level has reached its lower warning limit | 31 | *EvPlus12Millivolts (5.2.1.1) *hsADC1WarningLowerLimit (5.2.1.1) |
| *TpNeg12V WarnHi #.32 | Negative 12 Voltage level has reached its upper warning limit | 32 | *EvNeg12Millivolts (5.2.2.1) *hsADC4WarningUpperLimit (5.2.2.1) |
| *TpNeg12V WarnLo #.33 | Negative 12 Voltage level has reached its lower warning limit | 33 | *EyNeg12Millivolts (5.2.2.1) *hsADC4WarningLowerLimit (5.2.2.1) |
| *TpPlus5V WarnHi #.34 | Plus 5 Voltage level has reached its upper warning limit | 34 | *EvPlus5Millivolts (5.2.3.1) *hsADC2WarningUpperLimit (5.2.3.1) |
| *TpPlus5V WarnLo #.35 | Plus 5 Voltage level has reached its lower warning limit | 35 | *EvPlus5Millivolts (5.2.3.1) *hsADC2WarningLowerLimit (5.2.3.1) |
| *TpCPUAV WarnHi #.36 | CPU A Voltage level has reached its upper warning limit | 36 | *EvCPUAMillivolts (5.2.4.1) *hsADC3WarningUpperLimit (5.2.4.1) |
| *TpCPUAV WarnLo #.37 | CPU A Voltage level has reached its lower warning limit | 37 | *EvCPUAMillivolts (5.2.4.1) *hsADC3WarningLowerLimit (5.2.4.1) |
| *TpCPUBV WarnHi #.38 | CPU B Voltage level has reached its upper warning limit | 38 | *EvCPUBMillivolts (5.2.5.1) *hsADC7WarningUpperLimit (5.2.5.1) |
| *TpCPUBV WarnLo #.39 | CPU B Voltage level has reached its lower warning limit | 39 | *EvCPUBMillivolts (5.2.5.1) *hsADC7WarningLowerLimit (5.2.5.1) |

I/O DEVICES LIST BOX INFORMATION TABLE
*(name preface) = zSvMIBcfIO   #(OID preface) = 1.3.6.1.4.1.1743.1.1.2.5

| Name & OID | Information | Type | Value | Display As |
|---|---|---|---|---|
| *CardString[*SlotIndex] #.1.3[#.1.1] | Manufacturer's Name | Display String | Identification string | Display String |
| *SlotIndex[*SlotIndex] #.1.1[#.1.1] | Displayed Logical Identification Name | Integer | 1–n: where n is the highest slot number configured | Decimal |
| *BusType[*SlotIndex] #.1.19[#.1.1] | Bus Type | Integer | 1 = Unknown<br>2 = ISA<br>3 = EISA<br>4 = PCI<br>5 = PCMCIA<br>6 = EISA/PCI combination<br>7 = ISA/PCI combination | Enumerated String Equivalent |
| *IRQ[*SlotIndex] #.1.10[#1.1] | IRQ | Integer | 0–15: Configured IRQ | Decimal |
| *DMAType[*SlotIndex] #.1.20[#1.1] | DMA Type | Integer | 1 = none<br>2 = ISA Compatible<br>3 = Type A<br>4 = Type B<br>5 = Type C<br>6 = Type F<br>7 = Bus Master | Internal control; DMA Channel qualifier |
| *DMAChannel[*SlotIndex] | DMA Channel | Integer | 0–7: Configured | Decimal |

-continued

I/O DEVICES LIST BOX INFORMATION TABLE
*(name preface) = zSvMIBcfIO    #(OID preface) = 1.3.6.1.4.1.1743.1.1.2.5

| Name & OID | Information | Type | Value | Display As |
|---|---|---|---|---|
| #.1.21 [#1.1] | | | DMA Channel | |
| *ROMHi[*SlotIndex] #.1.14[.1.1] | HI-ROM Address | Integer | Configured High ROM Address 0 = no RAM used | HexaDecimal |
| *ROMLo[*SlotIndex] #.1.13[#.1.1] | Low-ROM Address | Integer | Configured Base ROM Address 0 = no RAM used | HexaDecimal |
| *AddrHi[*SlotIndex] #.1.9[#.1.1] | Hi-IO Address | Integer | Configured High IO Address 0 = no IO space used | HexaDecimal |
| *AddrLo[*SlotIndex] #.1.8[#.1.1] | Low-IO Address | Integer | Configured Base IO Address 0 = no IO space used | HexaDecimal |
| *PCIBUS[*SlotIndex] #.1.27[#.1.1] | PCI Bus Number | Integer | PCI bus on which this device is configured. | Hexadecimal |
| *Device[*SlotIndex] #.1.28[#.1.1] | PCI Device # EISA Slot # | Integer | PCI device # or EISA slot # of this device. | Hexadecimal |
| *InternalDevice[*SlotIndex] #1.29[#.1.1] | Internal/External Indicator | Integer | 1 = Internal 2 = External | Enumerated string equivalent |

SCSI DEVICE INFORMATION TABLE
Display Information Per SCSI Device
*(name preface) = zSvMIBst    #(OID preface) = 1.3.6.1.4.1.1743.1.1.12.2

| Name & OID | Information | Type | Value | Display As |
|---|---|---|---|---|
| *SCSITargetID[*SCSIDevIndex] #.1.11[#.1.1] | Device Id | Integer | 0–15; Configured device id | Decimal |
| *SCSIDevType[*SCSIDevIndex] #.1.2[#.1.1] | Device Type | Integer | 01 = Direct-access device 02 = Sequential-access device 03 = Printer device 04 = Processor device 05 = Write-once media 06 = CD-ROM device 07 = Scanner device 08 = Optical memory device 09 = Medium changer device 0A = Communications device 20 = Unknown or no device 21 = Host Adapter | Enumerated String Equivalent |
| *SCSIVendorID[*SCSIDevIndex] #.1.4[#.1.1] | Manufacturer's Name | Display String | Identification String (8 chars) | Display String |
| *SCSIProductId[*SCSIDevIndex] #.1.5[#.1.1] | Product Name | Display String | Identification String (16 chars) | Display String |
| *SCSIDevRevision[*SCSIDevIndex] #.1.7[#.1.1] | Product Revision | Display String | Revision String (4 chars) | Display String |
| *SCSIDevSerialNum[*SCSIDevIndex] #.1.6[#.1.1] | Unit Serial Number | Display String | Identification String (10 chars) | Display String |
| *SCSIDevStatus[*SCSIDevIndex] #.1.3[#.1.1] | Operational status | Integer | 1 = unknown 2 = operational 3 = not ready 4 = no response | Enumerated string Equivalent |

-continued

SCSI DEVICE INFORMATION TABLE
Display Information Per SCSI Device
*(name preface) = zSvMIBst    #(OID preface) = 1.3.6.1.4.1.1743.1.1.12.2

| Name & OID | Information | Type | Value | Display As |
|---|---|---|---|---|
|  |  |  | 5 = not initialized<br>6 = busy<br>7 = media not present |  |
| *SCSICapacity[*SCSIDevIndex]<br>#.1.9[#.1.1] | Device capacity in MB | Integer | Drive capacity in megabytes | Decimal |
| *SCSIFWDate[*SCSIDevIndex]<br>#.1.8[#.1.1] | Device control FW revision | Display String | Revision string (32 chars) | Display String |
| *SCSIHost[*SCSIDevIndex]<br>#.1.8[#.1.1] | Controlling Host Adapter | Integer | Host Adapter number | Internal control |
| *SCSIPCIBUS[*SCSIDevIndex]<br>#.1.8[#.1.1] | Host adapter's PCI bus # | Integer | PCI bus # of this device's host adapter | Internal control |
| *SCSIIODevice[*SCSIDevIndex]<br>#.1.8[#.1.1] | Host adapter's PCI device # | Integer | PCI device # or EISA slot # of this device's host adapter | Internal control |

PROCESSOR INFORMATION TABLE
*(name preface) = zSvMIBcfProc    #(OID preface) = 1.3.6.1.4.1.1743.1.1.2.2

| Name & OID | Information | Type | Value | Display As |
|---|---|---|---|---|
| *Type [*Index]<br>#.1.2[#.1.1] | Processor Type | Integer | 1 = Unknown<br>2 = I486<br>3 = P24T<br>4 = P5<br>5 = P54C<br>6 = P6<br>7 = PowerPC | Enumerated String Equivalent |
| *IHertz [*Index]<br>#.1.9[#.1.1] | Processor Speed | Integer | Frequency in MegaHertz | Decimal |
| *L1CodeCacheSize [*Index]<br>#.1.16[#.1.1] | Instruction Cache Size | Integer | Size in Bytes | Decimal |
| *L1DataCacheSize [*Iindex]<br>#.1.12[#1.1] | Data Cache Size | Integer | Size in Bytes | Decimal |
| *L2CodeCacheSize [*Index]<br>#.1.23[#.1.1] | Level 2 Cache Size | Integer | Size in KiloBytes | Decimal |
| *Step [*Index]<br>#.1.5[#.1.1] | Processor Stepping | Integer | Manufacturers Stepping revision number | Decimal |

MEMORY INFORMATION TABLE

| OID Name | Information | Type | Value | Display As |
|---|---|---|---|---|
|  | *(name preface) = zSvMIBcfMem | | #(OID preface) = 1.3.6.1.4.1.1743 | |
| *Index<br>#.1.1.2.11.1.1 | Count of memory boards | Integer | 1 ... 16 | Internal Control |
| *Size [*Index]<br>#.1.1.2.11.1.2[#.1.1.2.11.1.1] | Memory Size for the System | Integer | Size in Mega-Bytes | Decimal |
| *Capacity [Index]<br>#.1.1.2.11.1.3[#.1.1.2.11.1.1] | Memory Capacity for Card or system | Integer | Size in Mega-Bytes | Decimal |
| *Banks [*Index]<br>#.1.1.2.11.1.4[#.1.1.2.11.1.1] | Number of Banks for Card or System | Integer | Size in Mega-Bytes | Decimal |
| *ECC [*Index]<br>#.1.1.2.11.1.6[#.1.1.2.11.1.1] | ECC Type | Integer | 1 Unknown<br>2 None | Enumerated String Equivalent |

-continued

MEMORY INFORMATION TABLE

| OID Name | Information | Type | Value | Display As |
|---|---|---|---|---|
| | | | 3 Single-bit-ecc | |
| | | | 4 Multi-bit-ecc | |
| *SIMMS [*Index] #.1.1.2.11.1.5[#.1.1.2.11.1.1] | Number of SIMM slots for card or system | Integer | Count of simms | Decimal |
| | *(name preface) = zSvMIBEv | | #(OID preface) = 1.3.6.1.4.1.1743 | |
| *SIMMYerr0 #.1.1.10.12 | Slot # and SIMM # of the last correctable error | Integer | Bits 6 & 7 = slot # Bits 0–5 = SIMM # | Hi-light Error Simm in Yellow |
| *SIMMRerr0 #.1.1.10.13 | Slot # and Bank # of the last uncorrectable error | Integer | Bits 6 & 7 = slot # Bits 0–5 = Bank # | Hi-light Error Bank in Red |
| | *(name preface) = zSvMIBhsMem | | #(OID preface) = 1.3.6.1.4.1.1743 | |
| *Yellows #.1.1.7.2 | The total number of Yellows that have occurred | Counter | Count of Yellows | Decimal |
| *Reds #.1.1.7.1 | The total number of Reds that have occurred | Counter | Count of Reds | Decimal |

VOLUME INFORMATION TABLE
(OIDPreface) = 1.3.6.1.4.1.1743

| OID Name | Information | Type | Value | Display As |
|---|---|---|---|---|
| zSvMIBstVolumeTotal #.1.1.12.3.0 | Volume Total | Integer | 1 – i (Max i = 64) | Decimal |
| zSvMIBstVolumeIndex #.1.1.12.4.1.1.i | Volume Index | Integer | 1 – i (Max i = 64) | Decimal |
| zSvMIBstVolumeName #.1.1.12.4.1.2.i | Volume Name | Display String | 0–31 char Displayable ASCII String | ASCII |
| zSvMIBstVolumeSize #.1.1.12.4.1.3.i | Volume Size | Integer | 0–4,294,967,296 | Decimal |
| zSvMIBstVolumeFreeSpace #.1.1.12.4.1.4.i | Volume Free Space | Integer | 0–4,294,967,296 | Decimal |
| zSvMIBstVolumeUsed #.1.1.12.4.1.5.i | Volume Used | Integer | 0–100% | Decimal |
| zSvMIBstVolumeUsedHiWater #.1.1.12.4.1.6.i | Volume Used Hi-Water | Integer | 0–100% | Decimal |
| zSvMIBstVolumeUnits #.1.1.12.4.1.7.i | Units of Scale for Volume Size and Free Space | Integer | 0–4,294,967,296 | Decimal |

ENCLOSURE INFORMATION TABLE

| Name & OID | Information | Type | Value | Display As |
|---|---|---|---|---|
| *(name preface) = zSvMIBEv | | | #(OID preface) = 1.3.6.1.4.1.1743.1.1.10 | |
| *Temp1Centigrade #.50 | Temperature Sensor 1 | Integer | Temperature in degrees centigrade | Decimal |
| *Temp1FatalUpLim #.57 | Sensor 1 Fatal Upper Limit | Integer | Fatal upper limit in degrees centigrade | Decimal |
| *Temp1FatalLowLim #.64 | Sensor 1 Fatal Lower Limit | Integer | Fatal lower limit in degrees centigrade | Decimal |
| *Temp1WarningUpLim #.71 | Sensor 1 Warning Upper Limit | Integer | Warning upper limit in degrees centigrade | Decimal |
| *Temp1WarningLowLim #.78 | Sensor 1 Warning Lower Limit | Integer | Warning lower limit in degrees centigrade | Decimal |
| *Temp1Enable | Sensor 1 | Integer | 0 = disable | Boolean |

-continued

ENCLOSURE INFORMATION TABLE

| Name & OID | Information | Type | Value | Display As |
|---|---|---|---|---|
| #.85 | Enable | | 1 = enable | |
| *Temp2Centigrade #.51 | Temperature Sensor 2 | Integer | Temperature in degrees centigrade | Decimal |
| *Temp2FatalUpLim #.58 | Sensor 2 Fatal Upper Limit | Integer | Fatal upper limit in degrees centigrade | Decimal |
| *Temp2FatalLowLim #.65 | Sensor 2 Fatal Lower Limit | Integer | Fatal lower limit in degrees centigrade | Decimal |
| *Temp2WarningUpLim #.72 | Sensor 2 Warning Upper Limit | Integer | Warning upper limit in degrees centigrade | Decimal |
| *Temp2WarningLowLim #.79 | Sensor 2 Warning Lower Limit | Integer | Warning lower limit in degrees centigrade | Decimal |
| *Temp2Enable #.86 | Sensor 2 Enable | Integer | 0 = disable 1 = enable | Boolean |
| *(name preface) = zSvMIBhs | | #(OID preface) = 1.3.6.1.4.1.1743.1.1.7 | | |
| *ADC5FatalUpperLimit #.22 | Sensor 1 Fatal Upper Limit Count | Integer | Count of number of times fatal upper limit reached | Decimal |
| *ADC5FatalLowerLimit #.21 | Sensor 1 Fatal Lower Limit Count | Integer | Count of number of times fatal lower limit reached | Decimal |
| *ADC5WarningUpperLimit #.20 | Sensor 1 Warning Upper Limit Count | Integer | Count of number of times warning upper limit reached | Decimal |
| *ADC5WarningLowerLimit #.19 | Sensor 1 Warning Lower Limit Count | Integer | Count of number of times warning lower limit reached | Decimal |
| *ADC6FatalUpperLimit #.26 | Sensor 2 Fatal Upper Limit Count | Integer | Count of number of times fatal upper limit reached | Decimal |
| *ADC6FatalLowerLimit #.25 | Sensor 2 Fatal Lower Limit Count | Integer | Count of number of times fatal lower limit reached | Decimal |
| *ADC6WarningUpperLimit #.24 | Sensor 2 Warning Upper Limit Count | Integer | Count of number of times warning upper limit reached | Decimal |
| *ADC6WarningLowerLimit #.23 | Sensor 2 Warning Lower Limit Count | Integer | Count of number of times warning lower limit reached | Decimal |

PLUS 12 VOLTAGE INFORMATION TABLE

| Name & OID | Information | Type | Value | Display As |
|---|---|---|---|---|
| *(name preface) = zSvMIBEv | | #(OID preface) = 1.3.6.1.4.1.1743.1.1.10 | | |
| *Plus12Millivolts #.46 | Current +12 Voltage to peripherals | Integer | Voltage in millivolts | Decimal |
| *Plus12FatalUpLim #.53 | Plus 12 Voltage Fatal Upper Limit | Integer | Fatal upper limit in millivolts | Decimal |
| *Plus12FatalLowLim #.60 | Plus 12 Voltage Fatal Lower Limit | Integer | Fatal lower limit in millivolts | Decimal |
| *Plus12WarningUpLim #.67 | Plus 12 Voltage Warning Upper Limit | Integer | Warning upper limit in millivolts | Decimal |
| *Plus12WarningLowLim #.74 | Plus 12 Voltage Warning Lower Limit | Integer | Warning lower limit in millivolts | Decimal |
| *Plus12Enable #.81 | Plus 12 Voltage Enable | Integer | 0 = disable 1 = enable | Boolean |

-continued

PLUS 12 VOLTAGE INFORMATION TABLE

| Name & OID | Information | Type | Value | Display As |
|---|---|---|---|---|
| *(name preface) = zSvMIBhs | | #(OID preface) = 1.3.6.1.4.1.1743.1.1.7 | | |
| *ADC1FatalUpperLimit #.6 | Plus 12 Voltage Fatal Upper Limit Count | Integer | Count of number of times fatal upper limit reached | Decimal |
| *ADC1FatalLowerLimit #.5 | Plus 12 Voltage Fatal Lower Limit Count | Integer | Count of number of times fatal lower limit reached | Decimal |
| *ADC1WarningUpperLimit #.4 | Plus 12 Voltage Warning Upper Limit Count | Integer | Count of number of times warning upper limit reached | Decimal |
| *ADC1WarningLowerLimit #.3 | Plus 12 Voltage Warning Lower Limit Count | Integer | Count of number of times warning lower limit reached | Decimal |

NEGATIVE 12 VOLTAGE INFORMATION TABLE

| Name & OID | Information | Type | Value | Display As |
|---|---|---|---|---|
| *(name preface) = zSvMIBEv | | #(OID preface) = 1.3.6.1.4.1.1743.1.1.10 | | |
| *Neg12Millivolts #.49 | Current −12 Voltage to peripherals | Integer | Voltage in millivolts | Decimal |
| *Neg12FatalUpLim #.56 | Negative 12 Voltage Fatal Upper Limit | Integer | Fatal upper limit in millivolts | Decimal |
| *Neg12FatalLowLim #.60 | Negative 12 Voltage Fatal Lower Limit | Integer | Fatal lower limit in millivolts | Decimal |
| *Neg12WarningUpLim #.70 | Negative 12 Voltage Warning Upper Limit | Integer | Warning upper limit in millivolts | Decimal |
| *Neg12WarningLowLim #.77 | Negative 12 Voltage Warning Lower Limit | Integer | Warning lower limit in millivolts | Decimal |
| *Neg12Enable #.84 | Negative 12 Voltage Enable | Integer | 0 = disable 1 = enable | Boolean |
| *(name preface) = zSvMIBhs | | #(OID preface) = 1.3.6.1.4.1.1743.1.1.7 | | |
| *ADC4FatalUpperLimit #.18 | Negative 12 Voltage Fatal Upper Limit Count | Integer | Count of number of times fatal upper limit reached | Decimal |
| *ADC4FatalLowerLimit #.17 | Negative 12 Voltage Fatal Lower Limit Count | Integer | Count of number of times fatal lower limit reached | Decimal |
| *ADC4WarningUpperLimit #.16 | Negative 12 Voltage Warning Upper Limit Count | Integer | Count of number of times warning upper limit reached | Decimal |
| *ADC4WarningLowerLimit #.15 | Negative 12 Voltage Warning Lower Limit Count | Integer | Count of number of times warning lower limit reached | Decimal |

PLUS 5 VOLTAGE INFORMATION TABLE

| Name & OID | Information | Type | Value | Display As |
|---|---|---|---|---|
| *(name preface) = zSvMIBEv | | #(OID preface) = 1.3.6.1.4.1.1743.1.1.10 | | |
| *Plus5Millivolts #.47 | Current Voltage to Baseboard Electronics | Integer | Voltage in millivolts | Decimal |
| *Plus5FatalUpLim #.54 | Plus 5 Voltage Fatal Upper Limit | Integer | Fatal upper limit in millivolts | Decimal |
| *Plus5FatalLowLim #.61 | Plus 5 Voltage Fatal Lower Limit | Integer | Fatal lower limit in millivolts | Decimal |
| *Plus5WarningUpLim #.68 | Plus 5 Voltage Warning Upper Limit | Integer | Warning upper limit in millivolts | Decimal |
| *Plus5WarningLowLim #.75 | Plus 5 Voltage Warning Lower Limit | Integer | Warning lower limit in millivolts | Decimal |
| *Plus5Enable #.82 | Plus 5 Voltage Enable | Integer | 0 = disable 1 = enable | Boolean |
| *(name preface) = zSvMIBhs | | #(OID preface) = 1.3.6.1.4.1.1743.1.1.7 | | |
| *ADC2FatalUpperLimit #.10 | Plus 5 Voltage Fatal Upper Limit Count | Integer | Count of number of times fatal upper limit reached | Decimal |
| *ADC2FatalLowerLimit #.9 | Plus 5 Voltage Fatal Lower Limit Count | Integer | Count of number of times fatal lower limit reached | Decimal |
| *ADC2WarningUpperLimit #.8 | Plus 5 Voltage Warning Upper Limit Count | Integer | Count of number of times warning upper limit reached | Decimal |
| *ADC2WarningLowerLimit #.7 | Plus 5 Voltage Warning Lower Limit Count | Integer | Count of number of times warning lower limit reached | Decimal |

CPU A VOLTAGE INFORMATION TABLE

| Name & OID | Information | Type | Value | Display As |
|---|---|---|---|---|
| *(name preface) = zSvMIBEv | | #(OID preface) = 1.3.6.1.4.1.1743.1.1.10 | | |
| *CPUAMillivolts #.48 | Current Voltage to CPUs | Integer | Voltage in millivolts | Decimal |
| *CPUAFatalUpLim #.55 | CPUA Voltage Fatal Upper Limit | Integer | Fatal upper limit in millivolts | Decimal |
| *CPUAFatalLowLim #.62 | CPUA Voltage Fatal Lower Limit | Integer | Fatal lower limit in millivolts | Decimal |
| *CPUAWarningUpLim #.69 | CPUA Voltage Warning Upper Limit | Integer | Warning upper limit in millivolts | Decimal |
| *CPUAWarningLowLim #.76 | CPUA Voltage Warning Lower Limit | Integer | Warning lower limit in millivolts | Decimal |
| *CPUAEnable #.83 | CPUA Voltage Enable | Integer | 0 = disable 1 = enable | Boolean |
| *(name preface) = zSvMIBhs | | #(OID preface) = 1.3.6.1.4.1.1743.1.1.7 | | |
| *ADC3FatalUpperLimit #.14 | CPUA Voltage Fatal Upper Limit Count | Integer | Count of number of times fatal upper limit reached | Decimal |
| *ADC3FatalLowerLimit #.13 | CPUA Voltage Fatal Lower Limit Count | Integer | Count of number of times fatal lower limit reached | Decimal |
| *ADC3WarningUpperLimit #.12 | CPUA Voltage Warning | Integer | Count of number of times warning | Decimal |

-continued

CPU A VOLTAGE INFORMATION TABLE

| Name & OID | Information | Type | Value | Display As |
|---|---|---|---|---|
| *ADC3WarningLowerLimit #.11 | Upper Limit Count CPUA Voltage Warning Lower Limit Count | Integer | upper limit reached Count of number of times warning lower limit reached | Decimal |

CPU B VOLTAGE INFORMATION TABLE

| Name & OID | Information | Type | Value | Display As |
|---|---|---|---|---|
| *CPUBMillivolts #.52 | Current Voltage to CPUs | Integer | Voltage in millivolts | Decimal |
| *CPUBFatalUpLim #.59 | CPUB Voltage Fatal Upper Limit | Integer | Fatal upper limit in millivolts | Decimal |
| *CPUBFatalLowLim #.66 | CPUB Voltage Fatal Lower Limit | Integer | Fatal lower limit in millivolts | Decimal |
| *CPUBWarningUpLim #.73 | CPUB Voltage Warning Upper Limit | Integer | Warning upper limit in millivolts | Decimal |
| *CPUBWarningLowLim #.80 | CPUB Voltage Warning Lower Limit | Integer | Warning lower limit in millivolts | Decimal |
| *CPUBEnable #.87 | CPUB Voltage Enable | Integer | 0 = disable 1 = enable | Boolean |
| *(name preface) = zSvMIBEv #(OID preface) = 1.3.6.1.4.1.1743.1.1.10 | | | | |
| *ADC7FatalUpperLimit #.30 | CPUB Voltage Fatal Upper Limit Count | Integer | Count of number of times fatal upper limit reached | Decimal |
| *ADC7FatalLowerLimit #.29 | CPUB Voltage Fatal Lower Limit Count | Integer | Count of number of times fatal lower limit reached | Decimal |
| *ADC7WarningUpperLimit #.28 | CPUB Voltage Warning Upper Limit Count | Integer | Count of number of times warning upper limit reached | Decimal |
| *ADC7WarningLowerLimit #.27 | CPUB Voltage Warning Lower Limit Count | Integer | Count of number of times warning lower limit reached | Decimal |

*(name preface) = zSvMIBhs
(OID preface) = 1.3.6.1.4.1.1743.1.1.7

CABINET DOOR INFORMATION TABLE

| Name & OID | Information | Type | Value | Display As |
|---|---|---|---|---|
| *DoorOpen #.8 | Door Open Indicator | Integer | 0 = Door closed 1 = Door open | Boolean |

*(name preface) = zSvMIBEv
(OID preface) = 1.3.6.1.4.1.1743.1.1.10

FAN INFORMATION TABLE

| Name & OID | Information | Type | Value | Display As |
|---|---|---|---|---|
| *FanFailure #.9 | Fan Failure Indicator | Integer | 0 = Fan operational 1 = Fan failed | Boolean |

*(name preface) zSvMIBEv
(OID preface) = 1.3.6.1.4.1.1743.1.1.10

ENCLOSURE CONTROL INFORMATION TABLE

| Name & OID | Information | Type | Value | Display As |
|---|---|---|---|---|
| *Initialize #.1 | Initialization mode | Integer | 0 = SW initialization mode<br>1 = BIOS initialization mode | Boolean |
| *SetDefaults #.2 | Set Enclosure sensor defaults | Integer | 0 = Do not set defaults<br>1 Set defaults | Boolean |

*(name preface) = zSvMIBin
(OID preface) = 1.3.6.1.4.1.1743.1.1.14

A. Steps for Processing Display of Dialog Box

In the application implementation, all of the following steps take place in the order shown for processing the display of the dialog box resulting from an operator double clicking on the CPU #2 icon. The names of procedures are indicated in parentheses:

(1) User double clicks on the CPU #2 icon in the tree
    (DblClick) Tree control 10-6 triggers this procedure delivering an action code (integer)
        (DetailIcon) Jump table identifies action code as "display CPU #2"
            (QSub) Request for CPU #1 data is queued up with procedure
            (QSub again) Request for CPU #2 data queued up
            (QDialog) Request to display CPU dialog box queued up
            (CallNext1) Jump table takes first entry off queue, it is CPU data request
                (LoadCpuInfo1) Makes up list of data to get from server and set state variable
                    *(XOVBSnmpGet) Asks server for data by sending list of data via SNMP
                    return
                return
            return
        return
    return, computer drops into idle and waits
    (SnmpReply) Triggered when data for CPU #1 arrives from server
        *(XOVBSnmpFetchVarInfo) Transfers the newly arrived data from framework to Manager
        (CallNext2) Jump table procedure uses state variable to call proper procedure to store CPU data
            (LoadCpuInfo2) Stores data for use with CPU dialog box
        (CallNext1) Takes next entry off queue, it is CPU data request
        (LoadCpuInfo1) Makes up list of data to get from server and set state variable
            *(XOVBSnmpGet) Asks server for the data
            series of returns
    computer drops into idle and waits
    (SnmpReply) Triggered when data for CPU #2 arrives from server
        *(XOVBSnmpFetchVarInfo) Transfers the newly arrived data from framework to Manager
        (CallNext2) State variable dispatches procedure to perform CPU data processing
            (LoadCpuInfo2) Stores data for use with CPU dialog box
        (CallNext1) Takes next entry off queue which is request to display CPU dialog box
            *(frmProcData3.Show) Invokes CPU dialog box
        computer drops into idle
        (frmProcData3.Form_Load) Triggered when dialog box is first invoked, puts data in dialog box
    (2) Dialog box with CPU data appears
        computer drops into idle, awaiting the user's next move
* Each procedure preceded by an asterick is provided by a library function within the framework facility 10-4.

B.        Examples of Procedure Code
1.        Double Click Procedure
        Private Sub treServer_DblClick( )
Dim iActionA%, iUnitA%, iIndexA%
iIndexA = treServer.ListIndex
iActionA = iaActionG(iIndexA)
iUnitA = iaUnitG(iIndexA)
If iActionA <> 0 Then iaPopularG(iIndexA) = 1 'flag this item as seen
DetailIcon iActionA, iUnitA   'expand the icon
iActionG = 0 'cancel out after use
iUnitG = 0
'wait until frmServerMain.Form.MouseMove to do CallNext1 to prevent
'a new dialog box' losing focus to the main form and tree
End Sub
2.        DetailIcon Procedure
        Public Sub DetailIcon(iActionP%, iUnitP%)
'process double clicking of main tree nodes -continued

```
Dim i%, iActionA%, iUnitA%, iIndexA%
Dim 1StatusA&, 1ValueA&
frmServerMain.MousePointer = 11 'show hourglass in case there is a delay
iAction = iActionP
iUnitA = iUnitP
'iaBoxUpdG( ) should not be set to 1 since that will prevent old
'trap data from being reflected in the icon colors.
If iActionA = SHOW1CPU Then   'request showing of CPU detailed data panel
     For i = 1 To iNumCpuG 'load all now since can view any or all with one tree click
later
     If iaLoadCpuG(i) = 0 Then
          QSub LOADCPU1, i
        End If
      Next i
      QDialog SHOW1CPU, iUnitA
    ElseIf iAction = SHOW1MEM Then 'request showing of single memory subsystem
panel
      For i= 1 To iNumMemG
        If iaLoadMemG(iUnitA) = 0 Then
          QSub LOADMEM1, i
        End If
      Next i
      QDialog SHOW1MEM, iUnitA
Else                  'no special action, turn off hourglass
        frmServer.Main.MousePointer = 0
      End If
End Sub
3.      QSub Procedure
          Public Sub QSub(ByVal iNextCodeP%, ByVal iNextUnitP%)
'Queue up a subroutine call that could not be done right away for
'such reasons as already awaiting data from the MIB via SNMP
'
Dim i%
iNextSubG = iNextSubG + 1
If iNextSubG > UBound(iaNextSubG) Then
        MsgBox "(ZV1202) Internal overload." + s2Eo1G + "Too many queued events,
possibly caused by choosing too many actions too quickly. S-VIEW Application attempts
to continue but some expected actions may be skipped.", vbOKOnly + vbCritical,
sNAME1
      Exit Sub
    End If
    For i = 1 To iNextSubG 'get rid of duplicates, routine asked for now becomes last in
queue
        If iaNextSubG(i) = iNextCodep And iaNextUnitSG(i) = iNextUnitP Then
          iaNextSubG(i) = LOADSKIP
        End If
      Next i
      iaNextSubG(iNextSubG) = iNextCodeP 'action code e.g. SHOW1CPU for CPUs
      iaNextUnitSG(iNextSubG) = iNextUnitP 'unit e.g. 1 as in CPU #1
End Sub
4.      QDialog Procedure
          Public Sub QDialog(ByVal iNextCodeP%, ByVal iNextUnitP%)
'request that a routine, usually one that brings up a dialog box,
'be called after all routines queued up on a higher priority
'queue (using QSUB) have already been called.
      Dim i%
      iNextDlgG = iNextDlgG + 1
      If iNextDlgG > UBound(iaNextDlgG) Then
        MsgBox "(ZV1202) Internal overload." + s2Eo1G + "Too many queued events,
possibly caused by choosing too many actions too quickly. S-VIEW Application attempts
to continue but some expected actions may be skipped.", vbOKOnly + vbCritical,
sNAME1
      Exit Sub
    End If
    For i = 1 To iNextDlgG 'get rid of duplicates
       If iaNextDlgG(i) iNextCodeP And iaNextUnitDG(i) = iNextUnitP Then
          iaNextDlgG(i) = LOADSKIP
        End If
      Next i
      iaNextDlgG(iNextDlgG) = iNextCodeP 'action code e.g. SHOW1CPU for CPUs
      iaNextUnitDG(iNextDlgG) = iNextUnitP 'unit e.g. 1 as in CPU #1
End Sub
5.      CallNext1 Procedure
          Public Sub CallNext1( )
'(If there is an SNMP request outstanding, do nothing here)
'Call the next level 1 (not triggered by SNMP or timer) subroutine on the queue.
'If none, call the next dialog (form) waiting to be shown.
'If none, just exit.
'Usually called after a block of functionality is finished and control
```

-continued

```
'would otherwise go back to the idle state.
'
    Dim iNextA%, iUnitA%, i%
    If iStateG <> 0 Then
        Exit Sub 'waiting for SNMP, don't call anything now, also leave mouse pointer
unchanged
    End If
While iaNextSubG(1) = LOADSKIP 'pass over holes
    For i = 2 To iNextSubG
        iaNextSubG(i - 1) = iaNextSubG(i) 'drop everything down
        iaNextUnitSG(i - 1) = iaNextUnitSG(i)
    Next i
    iaNextSubG(iNextSubG) = 0
    iNextSubG = iNextSubG - 1
Wend
While iaNextDlgG(1) = LOADSKIP 'get rid of holes
    For i = 2 To iNextDlgG
        iaNextDlgG(i - 1) = iaNextDlgG(i)
        iaNextUnitDG(i - 1) = iaNextUnitDG(i)
    Next i
    iaNextDlgG(iNextDlgG) = 0
    iNextDlgG = iNextDlgG - 1
Wend
If iNextSubG > 0 Then
    iNextA = iaNextSubG(1) 'take an entry and move everything on the queue down
    iUnitA = iaNextUnitSG(1)
    For i = 2 To iNextSubG
        iaNextSubG(i - 1) = iaNextSubG(i)
        iaNextUnitSG(i - 1) = iaNextUnitSG(i)
    Next i
    iaNextSubG(iNextSubG) = 0
    iNextSubG = iNextSubG - 1
If iNextA = LOADCPU1 Then
        iCurCpuG = iUnitA       'load data for a CPU
        LoadCpuInfo1
ElseIf iNextA = LOADMEM1 Then    ';pad data fpr a,e,pru bamlk
        iCurMemG = iUnitA
        LoadMemInfo1
End If 'iNextA . . .
ElseIf iNextDlgG > 0 Then   'request a dialog box if nothing above was requested
    iNextA = iaNextDlgG(1) 'take an entry and move everything on the queue down
    iUnitA = iaNextUnitDG(1)
    For i = 2 To iNextDlgG
        iaNextDlgG(i - 1) = iaNextDlgG(i)
        iaNextUnitDG(i - 1) = iaNextUnitDG(i)
    Next i
    iaNextDlgG(iNextDlgG) = 0
    iNextDlgG = iNextDlgG - 1
    If iNextA = SHOW1CPU Then
        If iShowCpuG <> -1 Then
            If iaLoadCpuG(iUnitA) = 0 Then
                MsgBox "1ZV1203) Information not available for CPU" + Str$(iUnitA), vbOKOnly
+ vbExclamation, sNAME1 + "(" + sNodeNameG + ")"
        Else
            iCurCpuG = iUnitA
            If iShowCpuG = 0 Then
                frmProcData3.Show 'single CPU panel
            Else
                frmProcData3.Redraw2
                ReShow frmProeData3
            End If
        End If
    Else
        iShowCpuG = 0   'reset this after skipping show once
    End If
ElseIf iNextA = SHOW1MEM Then   'single memory bank panel
    If iShowMemG = 0 Then
        iCurMemG = iUnitA       'bring up panel
        frmMemData3.Show
    ElseIf iShowMemG > 0 Then
        iCurMemG = iUnitA
        frmMemData3.RedrawMem   'update panel
        ReShow frmMemData3
    Else
        iShowMemG = 0
    End If
End If
    frmServerMain.MousePointer = 0 'get rid of hourglass after doing any of the above
    End If 'iNextSubG . . . if neither sub nor dialog waiting to be called, do nothing
```

-continued

```
End Sub
6.      LoadCpuInfo1 Procedure
        Public Sub LoadCpuInfo1( )
'Find out (from the server) all there is to know about CPU's
'
    Dim sUnit$, sTag$
    Dim iArraySize%, iBase%, iStatus%
    If iCurCpuG = 0 Then 'about all CPU's - seldom used because SNMP can't read that
many items at once
        iMinIterG = 1
        iCurIterG = 1
        iMaxIterG = iNumCpuG
    Else            'about just this one CPU - repeat in a loop to get all CPU's
        iMinIterG = iCurCpuG
        iCurIterG = iCurCpuG
        iMaxIterG = iCurCpuG
    End If
    iArraySize = (iMaxIterG - iCurIterG + 1) * CPUASKBLKSIZE
    If UBound(saNamesG) < iArraySize Then
        ReDim saNamesG(iArraySize)
    End If
    iBase = 0
    While iCurIterG <= iMaxIterG
        sUnit = Trim$(Str$(iCurIterG))
        saNamesG(iBase + 1) = PREFIX1D1D + "2.2.1.2." + sUnit 'CPU type code
        saNamesG(iBase + 2) = PREFIX1D1D + "2.2.1.9." + sUnit 'CPU speed
        saNamesG(iBase + 3) = PREFIX1D1D + "2.2.1.16." + sUnit 'Code cache #1 size
        saNamesG(iBase + 4) = PREFIX1D1D + "2.2.1.12." + sUnit 'Data cache #1 size
        saNamesG(iBase + 5) = PREFIX1D1D + "2.2.1.20." + sUnit 'Code cache #2 size
        saNamesG(iBase + 6) = PREFIX1D1D + "2.2.1.3." + sUnit 'CPU status
        saNamesG(iBase + 7) = PREFIX1D1D + "2.2.1.5." + sUnit 'CPU step code
        iCurIterG = iCurIterG + 1
        iBase = iBase + CPUASKBLKSIZE
    Wend
    iStateG = LOADCPU2
    iStatus = SnmpAsk4Longs(iBase, saNamesG( )) 'request the data, all long ints
    If iStatus < 0 Then
        If iCurCpuG = 0 Then
            sTag = "s"
        Else
            sTag = Str$(iCurCpuG)
        End If
        frmServerMain.MousePointer = 0 'get rid of hourglass before doing a MsgBox
        MsgBox "(ZV1301) Data request failed." + s2Eo1G + MSGNOCPLDATA + sTag,
vbOKOnly + vbExclamation, sNAME1
    End If
End Sub
7.      SnmpReply Procedure
        Private Sub Snmp1_SnmpReply(IReqIdP&, iNumVarsP%, lErrNumP%,
1ErrStatP&, 1ErrIndexP&)
'
'Procedure called automatically at the earliest opportunity when data
'from an SNMP request has arrived.
    Dim iStatus%, iLen%, i%, iChar1%, iChar2%, iChar3%, iChar4%
    Dim 1IdA&, 1Char&
    Dim sFiller$
    iNumDataG = iNumVarsP
    1ErrStatG = 1ErrStatP 'save this to be viewable from other functions
    1ErrItemG = 1ErrIndexP
    iErrNumG = iErrNumP
    tmrSnmp.Interval = 0 'stop our own SNMP timer
    tmrSnmp.Enabled = False
    1IdA = 1IdG      'SNMP message ID assigned by the Framework Application
    1IdG = 0
If UBound(zaInfoG) < iNumVarsP Then
        ReDim zaInfoG(iNumVarsP + 10)      'reserve space for arriving data
    End If
    If UBound(saNamesG) < iNumVarsP Then
        ReDim saNamesG(iNumVarsP + 10)       'reserve space for arriving OID strings
    End If
    sFiller = "abcdefghijklmnopqrstuvwxyz012345abcdefghijklmnopqrstuvwxyz012345"
(Filler Constant)
    For i = 1 To UBound(zaInfoG) 'pre-fill receiving strings to use as buffers
        zaInfoG(i).VarValue = sFiller + sFiller + sFiller + sFiller
    Next i
    For i = 1 To UBound(saNamesG)
        saNamesG(i) = sFiller + sFiller
    Nexti
    If 1ErrStatP = 0 And iErrNumG = 0 Then
```

-continued

```
        iSnmpStatusG = XOVB4SnmpFetchVarInfo(hSnmpCtrlG, IReqIdP, iNumVarsP,
saNamesG( ), zaInfoG( ))
    If iAskG = 2 Then 'expect all long integers
        If UBound(1aValuesG) < iNumVarsP Then ReDim 1aValuesG(iNumVarsP + 10)
        iFetchStatusG = 0
        For i = 1 To iNumVarsP
            If zaInfoG(i).ValType <> 2 And zaInfoG(i).ValType <> 65 And zaInfoG(i).ValType
<> 67 Then
                If zaInfoG(i).ValType = 4 Then
                    iLen = zaInfoG(i).ValLength
                    iChar2 = 0
                    iChar3 = 0
                    iChar4 = 0
                    If iLen <= 0 Then   'zero length string is given numeric value of zero
                        1aValuesG(i) = 0
                    ElseIf iLen = 1 Then
                        1aValuesG(i) = Asc(zaInfoG(i).VarValue)
                    ElseIf iLen = 2 Then
                        iChar1 = Asc(Mid$(zaInfoG(i).VarValue, 1, 1)) 'strings treated as little endian
31 bit unsigned
                        iChar2 = Asc(Mid$(zaInfoG(i).VarValue, 2, 1))
                        1aValuesG(i) = iChar1 + 256 * iChar2
                    ElseIf iLen = 3 Then
                        iChar1 = Asc(Mid$(zaInfoG(i).VarValue, 1, 1)) 'least sig.
                        iChar2 = Asc(Mid$(zaInfoG(i).VarValue, 2, 1))
                        iChar3 = Asc(Mid$(zaInfoG(i).VarValue, 3, 1)) 'most significant 8 bits
                        1aValuesG(i) = ZMakeLong(iChar1, iChar2, iChar3, 0) 'make a 32 bit integer
                    Else
                        iChar1 = Asc(Mid$(zaInfoG(i).VarValue, iLen - 3, 1)) '4 or more chars long,
use "last" 4 bytes
                        iChar2 = Asc(Mid$(zaInfoG(i).VarValue, iLen - 2, 1))
                        iChar3 = Asc(Mid$(zaInfoG(i).VarValue, iLen - 1, 1))'second to most
significant 8 bits
                        iChar4 = Asc(Mid$(zaInfoG(i).VarValue, iLen, 1))   'most significant 8 bits
                        1aValuesG(i) = ZMakeLong(iChar1, iChar2, iChar3, iChar4) 'make a 32 bit
integer
                    End If 'iLen = 0
                Else
                    1aValuesG(i) = 0   'returned value of wrong type, zero substituted
                End If   'zaInfoG(i).ValType = 4
            Else
                1aValuesG(i) = zaInfoG(i). VarValue
            End If
        Next i
    ElseIf iAskG = 5 Then 'expect mixed types
        iFetchStatusG = 0
    ElseIf iAskG = 9 Then 'expect all strings
        If UBound(saValuesG) < iNumVarsP Then ReDim saValuesG(iNumVarsP + 10)
        iFetchStatusG = 0
        For i = 1 To iNumVarsP
            If zaInfoG(i).ValType > 200 Then iFetchStatusG = -1
            saValuesG(i) = ""
            saValuesG(i) = zaInfoG(i).VarValue
        Next i
    Else
        iFetchStatusG = -3   'app. error, did not specify what kind of data
        KillNext1
    End If 'iAskG . . .
Else
    iFetchStatusG = -4   'arriving data packet had error somewhere in it
    iSnmpStatusG = -4
    KillNext1
End If   'IErrNumP . . .
    what routine do we call next?
    iAskG = 0
    CallNext2   'prionty routines
    CallNext1   'general routines
    Exit Sub
End Sub
8.      CallNext2 Procedure
        Public Sub CallNext2( )
'Decide what procedure to call next just after SNMP-Reply event or
'trap event or timer event is triggered.
'Usually called by SNMP Reply procedure of SNMP custom control
(fimServerMain.Snmp1)
    Dim iStateA%
    iStateA = iStateG
    iStateG = 0
If iStateA = LOADCPU2 Then
```

-continued

```
        LoadCpuInfo2    'data for a CPU
ElseIf iStateA = LOADME2 Then
        LoadMemInfo2    'data for a memory bank
ElseIf iStateA <> 0 Then
        MsgBox "(ZV1201) SNMP_Reply or similar event with unidentified data. This is a
system error that can lead to lost data or unperformed actions but Z-VIEW Manager
attempts to continue running.", vbOKOnly + vbCritical, sNAME1
'else' state variable of zero does nothing
End If
End Sub
```

9.  LoadCpuInfo2 Procedure
    Public Sub LoadCpuInfo2( )
'Get here after the frmServerMain SNMP reply procedure has supposedly received and
fetched data requested during the LoadCpuInfo1 procedure.
'

```
    Dim iBase%
    Dim sTag$
    If iFetchStatusG < 0 Then
        If iCurCpuG = 0 Then
            sTag = "s"
        Else
            sTag = Str$(iCurCpuG)
        End If
        frmServerMain.MousePointer = 0
        MsgBox "(ZV1322)" + MSGNOCPUDATA + sTag, vbOKOnly, sNAME1
        iShowCpuG = -1 'deny next request to show this dialog
    Else
        iBase = 0
        iCurIterG = iMinIterG
        While iCurIterG < = iMaxIterG
            iaCpuTypeG(iCurIterG) = MakeInt(1a ValuesG(iBase + 1))
            iaCpuSpeedG(iCurIterG) = MakeInt(1a ValuesG(iBase + 2))
            iaCpuCCache1G(iCurIterG) = MakeInt(1a ValuesG(iBase + 3))
            iaCpuDCache1G(iCurIterG) = MakeInt(1a ValuesG(iBase + 4))
            iaCpuCCache2G(iCurIterG) = MakeInt(1a ValuesG(iBase + 5))
            iaCpuStatusG(iCurIterG) = MakeInt(1a ValuesG(iBase + 6))
            iaCpuStepG(iCurIterG) = MakeInt(1a ValuesG(iBase + 7))
            iaLoadCpuG(iCurIterG) = 1 'this one's loaded
            iBase = iBase + CPUASKBLKSIZE
            iCurIterG = iCurIterG + 1
        Wend
        iActionG = 0
        iUnitG = 0
    End IfiFetchStatusG < . . .
End Sub
```

10. frmProcData3.Form_Load Procedure
    a.  Form Structure
        Begin VB.Form frmProcData3
        BorderStyle = 1 'Fixed Single
        Caption = "CPU Data"
        ClientHeight = 3255
        ClientLeft = 1635
        ClientTop = 5700
        ClientWidth = 6000
        Height = 3660
        Left = 1575
        LinkTopic = "Form1"
        MaxButton = 0 'False
        ScaleHeight = 217
        ScaleMode = 3 'Pixel
        ScaleWidth = 400
        Top = 5355
        Width = 6120
        Begin VB.PictureBox Picture1
            Height = 630
            Left = 5040
            ScaleHeight = 40
            ScaleMode = 3 'Pixel
            ScaleWidth = 40
            TabIndex = 20
            Top = 240
            Width = 630
        End
        Begin VB.CommandButton cmdHelp
            Caption = "Help"
            Height = 375
            Left = 4440
            TabIndex = 2
            Top = 2160

```
        Visible = 0 'False
        Width = 1215
    End
    Begin VB.ComboBox cboCpuId
        Height = 300
        Left = 4440
        Style = 2 'Dropdown List
        TabIndex = 0
        Top = 1035
        Width = 735
    End
    Begin VB.CommandButton cmdOK
        Caption = "OK"
        Default = -1 'True
        Height = 375
        Left = 4440
        TabIndex = 1
        Top = 1560
        Width = 1215
    End
    Begin VB.Label lb1Status
        BorderStyle = 1 'Fixed Single
        Height = 255
        Left = 1920
        TabIndex = 19
        Top = 2400
        Width = 1455
    End
    Begin VB.Label Label7
        Caption = "Status:"
        Height = 255
        Left = 360
        TabIndex = 18
        Top = 2400
        Width = 1335
    End
    Begin VB.Label Label6
        Caption = "Type:"
        Height = 255
        Left = 360
        TabIndex = 17
        Top = 240
        Width = 1335
    End
    Begin VB.Label Label5
        Caption = "Stepping:"
        Height = 255
        Left = 360
        TabIndex = 16
        Top = 600
        Width = 1335
    End
    Begin VB.Label Label3
        Caption = "Speed:"
        Height = 255
        Left = 360
        TabIndex = 15
        Top = 960
        Width = 1335
    End
    Begin VB.Label lb1L2CSize
        BorderStyle = 1 'Fixed Single
        Caption = "0 bytes"
        Height = 255
        Left = 1920
        TabIndex = 14
        Top = 2040
        Width = 1455
    End
    Begin VB.Label Label4
        Caption = "LeveL 2 Cache:"
        Height = 255
        Left = 360
        TabIndex = 13
        Top = 2040
        Width = 1335
    End
    Begin VB.Label lb1L1CSize
        BorderStyle = 1 'Fixed Single
```

-continued

```
      Caption = "0 bytes"
      Height = 255
      Left = 1920
      TabIndex = 12
      Top = 1680
      Width = 1455
   End
   Begin VB.Label Label2
      Caption = "Instruction Cache:"
      Height = 255
      Left = 360
      TabIndex = 11
      Top = 1680
      Width = 1335
   End
   Begin VB.Label lb1L1DSize
      BorderStyle = 1 'Fixed Single
      Caption = "0 bytes"
      Height = 255
      Left = 1920
      TabIndex = 10
      Top = 1320
      Width = 1455
   End
   Begin VB.Label Label1
      Caption = "Data Cache:"
      Height = 255
      Left = 360
      TabIndex = 9
      Top = 1320
      Width = 1335
   End
   Begin VB.Label balProc2
      Caption = "invisible balloon substitute"
      Height = 495
      Left = 3600
      TabIndex = 8
      Top = 2640
      Visible = 0 'False
      Width = 1455
   End
   Begin VB.Label lb1Rev
      BorderStyle = 1 'Fixed Single
      Height = 255
      Left = 1920
      TabIndex = 7
      Top = 600
      Width = 1455
   End
   Begin VB.Label lb1CpuMax
      Caption = "of 1"
      Height = 255
      Left = 5280
      TabIndex = 6
      Top = 1080
      Width = 495
   End
   Begin VB.Label lb1IntSpeed
      BorderStyle = 1 'Fixed Single
      Height = 255
      Left = 1920
      TabIndex = 5
      Top = 960
      Width = 1455
   End
   Begin VB.Label lb1Model
      BorderStyle = 1 'Fixed Single
      Height = 255
      Left = 1920
      TabIndex = 4
      Top = 240
      Width = 1455
   End
   Begin VB.Label lb1CpuId
      Alignment = 1 'Right Justify
      Caption = "CPU #"
      Height = 255
      Left = 3720
      TabIndex = 3
```

-continued

```
    Top = 1080
    Width = 615
    End
End
Attribute VB_Name = "frmProcData3"
Attribute VB_Creatable = False
Attribute VB_Exposed = False
svproc3.frm (frmProcData3)
'display information about any one CPU
Option Explicit
Option Base 1
Dim iCurCpuM% 'current CPU for this form, not necessarily equal to iCurCpuG
Dim iL1DStatusM%, iL1CStatusM%, iL2DStatusM%, iL2CStatusM%
Dim IL1DOrgM%, iL1COrgM%, iL2DOrgM%, iL2COrgM%
Dim iL1DTypeM%, iL1CTypeM%, iL2DTypeM%, iL2CTypeM%
Dim iIntSpeedM%, iExtSpeedM%, iNoGoM%, iCpuRevM%
Dim sCpuDescM$
Dim IL1DSizeM&, IL1CSizeM&, IL2DSizeM&, 1L2CSizeM&
b.   Private Sub Form_Load( )
    Dim i%
Picture1.Picture = frmServerMain.treServer.Loadedpicture(16) 'put neutral CPU icon in
right corner
    If iNumCpuG < 2 Then
        1b1CpuId.Visible = False '"crosstown" shortcut hidden if only 1 CPU
        cboCpuId.Visible = False
        1b1CpuMax.Visible = False
    Else
        1b1CpuId.Visible = True
        cboCpuId.Visible = True
        1b1CpuMax.Visible = True
    End If
    CenterForm frmProcData3
    Icon = frmServerMain.PicGray.Picture
    iShowCpuG = 1
    Redraw2   'put the data on the dialog box
CallNext1
End Sub
```

```
User     DetailIcon                              SnmpReply,
double   procedure           CallNext1  request CPU data        CallNext2
clicks   jump     queue up   jump   /         \ XOVB            jump
tree     table    cpu data request  table /  req. memory data  \ SnmpGet  table  store CPU data
node         /       \           /       \ call         /          \
  >        / memory req.\    >  /  req. disk data    \  idle >  /store memory data\
.............................................. . ................. .................. ..............................
^            / \          / \ / \ invoke,         (wait) \          / \
|          / \ queue up    / \  /  \show CPU dialog box      \                 / \
\ idle    /    disk drive req. / \   \                   \    store disk data   /
             \          / \      \show memory dialog box \                /
                \       < loop        / \  \                     \         /
               to queue up another req.  \  \show disk dialog box \              /
                              \                  \ idle  (do other things)  /
                              \                       (wait)               /
                              \        < loop                             /
                         after storing data call CallNext1 again
```

What is claimed is:

1. A method of organizing a graphical user inter-face application facility used for managing an operatively connected server system containing a number of major components and subcomponents, the graphical user inter-face being coupled to a server management framework facility containing graphical display apparatus, the method comprising the steps of:

(a) generating for display by the graphical display apparatus, a single hierarchical tree structure representing one of a number of server systems being managed, the tree structure having a number of levels with a root node at a first level and a number of subordinate nodes at succeeding levels, the number of subordinate nodes representing each different major server component of the server system, the major components being logically partitioned into succeeding levels which define subcomponents;

(b) associating and displaying a label representative of the server system at the root node, a number of different labels representative of the different major components at corresponding subordinate nodes and additional labels representative of the different subcomponents at corresponding subordinate nodes at expanded levels of the tree structure until a leaf endpoint is reached, the labels and subordinate nodes being displayed so as to delineate physical and logical relationships of the major components and their respective subcomponents; and (c) expanding the different levels of the tree structure in response to user selections for enabling a user to navigate through the plurality of levels of the server system for obtaining status and displaying labels representing the different subcomponents of the major components and their logical relationships to each other within the levels being accessed, each leaf endpoint defining a leaf element displaying an information dialog box window as the leaf element of each node and subordinate node, each information dialog box window containing a number of selectable entries which provide visual display of detailed information about the particular major component or subcomponent selected for access for providing rapid information retrieval with a minimum amount of information entities.

2. The method of claim 1 wherein each leaf endpoint defines a leaf element and wherein step (c) further includes displaying an information dialog box window as the leaf element of each node and subordinate node, each information dialog box window containing a number of selectable entries which provide visual display of detailed information about the particular major component or subcomponent selected for access.

3. The method of claim 1 wherein a number of the major components of the first level fall within the following categories: configuration, mass storage and environment.

4. The method of claim 1 wherein each of the labels includes an icon representation of one of the major components or subcomponents of the server system for providing maximum effective visualization of server system major components and subcomponents partitioning.

5. The method of claim 1 wherein the method further includes the steps of:

(d) accessing the server system for a number of information items identifying server type and characteristics of the major components and subcomponents of the server system; and, (e) building the hierarchical tree structure according to the information items defining the characteristics of the server system furnished by the server system.

6. The method of claim 5 wherein step (d) is initially performed when the server system is first selected and the application facility is launched.

7. The method of claim 5 wherein the information items defining the characteristics of the server system include items designating the number of central processing units (CPUs), the number of memory subsystems, the number of physical slots, the number of drive bays, the number of power supplies, the number of serial ports, the number of parallel ports, the number of input/output devices including associated controllers and the number of environmental status indications contained within the server system.

8. The method of claim 7 wherein the server system is housed in an enclosure and wherein the items defining the number of environmental status indications include enclosure door status and enclosure fan status indicators corresponding in number to a number of sensors contained within the enclosure.

9. The method of claim 5 wherein the accessing and building operations of steps (d) and (e) are repeated each time the graphical user interface application facility is initialized.

10. The method of claim 5 wherein the management framework facility includes a topological map for displaying where the server system is located and wherein the method further includes the step of integrating the graphical user interface application facility within the management framework facility to enable user selection of the server system for launching the graphical user interface application facility as a seamless operation.

11. The method of claim 1 wherein the hierarchical tree structure is organized into multilevels enabling the tree structure to be extended to accommodate new types of server systems.

12. The method of claim 11 wherein the tree structure is extended by adding a number of new subordinate nodes or deleting a number of existing subordinate nodes either at a particular level or at different succeeding levels.

13. The method of claim 2 wherein the method further includes the step of:

coloring the icons representing major components and their subcomponents in a predetermined manner for signaling occurrences of server system problem conditions at a high level of the tree structure for immediate user identification of each major component associated with a problem condition and user specific identification of any subcomponent of each major component associated with that problem condition through an expansion of the tree structure.

14. The method of claim 13 wherein the icon coloration step includes:

allocating a first color for coloring each icon to denote an absence of a problem condition, a second color for coloring each icon to denote an initial problem condition and a third color for coloring each icon to denote a more serious problem condition.

15. The method of claim 14 wherein the icon coloration step further includes:

selecting the color for each icon denoting the more serious problem condition upon occurrences of more than one problem condition pertaining to a particular major component.

16. The method of claim 14 wherein the icon coloration step further includes:

recoloring each icon displaying a problem condition to the first color upon removal of that problem condition from the server system.

17. A graphical user interface navigational mechanism which operatively couples to a management facility operatively coupled to a graphical display system, the facility running on a hardware platform for managing a number of server systems containing a number of major components and subcomponents, each of which operate under the control of a network operating system, each server system comprising a plurality of components and at least one management information component for storing information describing a set of server specific variables and the hierarchy used in managing server components, the navigational mechanism comprising:

a tree structure mechanism for displaying a single hierarchical tree representing the server system being managed, the tree structure having a number of levels containing a root node at a first level and a number of subordinate nodes at succeeding levels, the number of subordinate nodes representing each different server major component of the server system, the major components being logically partitioned into succeeding levels defining subcomponents of each logically partitioned major component, the tree structure being operative to associate and display a label representative of the server system at the root node and a number of different labels representative of the different major components and their respective subcomponents at corresponding ones of the number of subordinate nodes at succeeding levels of the tree structure until a leaf endpoint is reached, the labels and subordinate nodes being displayed so as to delineate physical and logical relationships of the major components and their respective subcomponents; and, a user interface mechanism operatively coupled to the tree structure mechanism, the user interface mechanism responsive to input selections to cause the tree structure mechanism to expand to the different levels of the tree structure for enabling the user to navigate through the plurality of levels of the server system being managed for ascertaining informational status and to display labels corresponding to the different subcomponents of the major components and their logical relationships to each other within the levels being accessed, each leaf endpoint of the tree structure mechanism defining a leaf element which includes components for generating an information dialog box window as the leaf element of each node and each subordinate node, each information dialog box window containing a number of selectable entries which provide visual display of detailed information about the particular major component or subcomponent selected for access for providing rapid information retrieval with a minimum amount of information entities.

18. The graphical interface navigational mechanism of claim 17 wherein each leaf endpoint of the tree structure mechanism defines a leaf element and wherein the tree structure mechanism includes components for generating an information dialog box window as the leaf element of each node and each subordinate node, each information dialog box window containing a number of selectable entries which provide visual display of detailed information about the particular major component or subcomponent selected for access.

19. The graphical user interface navigational mechanism of claim 17 wherein a number of the major components of the first level fall within categories which include the following: configuration, mass storage and environment.

20. The graphical user interface navigational mechanism of claim 17 wherein the tree structure mechanism generates for each of the labels, an icon representation of a corresponding one of the major components and subcomponents of the server system for providing ease of visualization of server system major components and subcomponents partitioning.

21. A graphical user interface navigational mechanism which operatively couples to a management facility operatively coupled to a graphical display system, the facility running on a hardware platform for managing a number of server systems containing a number of major components and subcomponents, each of which operate under the control of a network operating system, each server system comprising a plurality of components and at least one management information component for storing information describing a set of server specific variables and the hierarchy used in managing server components, the navigational mechanism comprising:

a tree structure mechanism for displaying a single hierarchical tree representing the server system being managed, the tree structure having a number of levels containing a root node at a first level and a number of subordinate nodes at succeeding levels, the number of subordinate nodes representing each different server major component of the server system, the major components being logically partitioned into succeeding levels defining subcomponents of each logically partitioned major component, the tree structure being operative to associate and display a label representative of the server system at the root node and a number of different labels representative of the different major components and their respective subcomponents at corresponding ones of the number of subordinate nodes at succeeding levels of the tree structure until a leaf endpoint is reached, the labels and subordinate nodes being displayed so as to delineate physical and logical relationships of the major components and their respective subcomponents;

a user interface mechanism operatively coupled to the tree structure mechanism, the user interface mechanism responsive to input selections to cause the tree structure mechanism to exand to the different levels of the tree structure for enabling the user to navigate through the plurality of levels of the server system being managed for ascertaining informational status and to display labels corresponding to the different subcomponents of the major components and their logical relationships to each other within the levels being accessed for providing rapid information retrieval with a minimum amount of information entities; and an access mechanism for accessing a number of information items from the server system, the information items including identifying server type and characteristics of the server system; and wherein the tree structure mechanism is operative to build the hierarchical tree structure according to those information items defining the characteristics of the server system furnished by the server system selected to be managed.

22. The graphical user interface navigational mechanism of claim 21 wherein the access mechanism initially accesses server information items when the server system is first selected and the graphical user interface navigational mechanism is launched.

23. The graphical user interface navigational mechanism of claim 21 wherein the information items defining the characteristics of the server system include items designating the number of central processing units (CPUs), the number of memory subsystems, the number of physical slots, the number of drive bays, the number of power supplies, the number of serial ports, the number of parallel ports, the number of input/output devices including associated controllers and the number of environmental sensors contained within the server system selected to be managed.

24. The graphical user interface navigational mechanism of claim 23 wherein each server system is housed within an enclosure and wherein the items defining the number of environmental sensors include enclosure door status and enclosure fan status indicators.

25. The graphical user interface navigational mechanism of claim 21 wherein the access mechanism and tree structure mechanism respectively access information items and build the tree structure each time the graphical user interface mechanism is initialized.

26. The graphical user interface navigational mechanism of claim 21 wherein the management framework facility includes a topological map for displaying where each server system is located and wherein the navigational mechanism is integrated within the management framework facility to enable selection of server systems for launching the graphical user interface navigational mechanism as a seamless operation.

27. The graphical user interface navigational mechanism of claim 17 wherein the hierarchical tree structure is organized into multilevels enabling the tree structure to be easily extended to accommodate new types of server systems.

28. The graphical user interface navigational mechanism of claim 27 wherein the tree structure is extended by adding or deleting a number of subordinate nodes either at a particular level or at different succeeding levels.

29. The graphical user interface navigational mechanism of claim 18 wherein the mechanism further includes:

an associative trap mechanism for processing trap signals received from the server system operatively coupled to the tree structure mechanism, the trap mechanism causing the tree structure mechanism to perform an icon coloration operation for signaling occurrences of server system problem conditions at a high level of the tree structure enabling immediate identification of each major component associated with a problem condition and specific identification of any subcomponent of the major component associated with that problem condition by expanding the tree structure down to a particular level.

30. The graphical user interface navigational mechanism of claim 29 wherein the trap mechanism causes the tree structure mechanism to generate a first color for coloring each icon to denote an absence of a problem condition, a second color for coloring each icon to denote an initial problem condition, and a third color for coloring each icon to denote a more serious problem condition.

31. The graphical user interface navigational mechanism of claim 29 wherein the trap mechanism causes the tree structure mechanism to generate the color for each icon denoting the more serious problem condition during occurrences of different types of problem conditions pertaining to a major component.

32. The graphical user interface navigational mechanism of claim 29 wherein the trap mechanism causes the tree structure mechanism to recolor each icon displaying a problem condition to the first color upon removal of that problem condition from the server system being monitored.

33. The graphical user interface navigational mechanism of claim 19 wherein first and second levels of the tree structure contain the root node and the subordinate nodes respectively, the tree structure mechanism in response to user selections generates a first screen display containing an icon depicting the type of server system being monitored, a second screen display containing icons depicting the major components of the server system, and a third screen display containing icons depicting the subcomponent of each major component of the server system.

* * * * *

UNITED STATES PATENT AND TRADEMARK OFFICE
CERTIFICATE OF CORRECTION

PATENT NO. : 6,128,016
DATED : October 3, 2000
INVENTOR(S) : Coelho, et al.

It is certified that error appears in the above-identified patent and that said Letters Patent is hereby corrected as shown below:

Claim 1, column 65,
Line 59, delete "inter-face" and insert -- interface --.
Line 62, delete "inter-face" and insert -- interface --.

Claim 21, column 70,
Line 21, delete "exand" and insert -- expand --.

Signed and Sealed this

Second Day of October, 2001

Attest:

NICHOLAS P. GODICI
Acting Director of the United States Patent and Trademark Office Attesting Officer